United States Patent
Foster et al.

(10) Patent No.: US 8,762,762 B2
(45) Date of Patent: Jun. 24, 2014

(54) DISTRIBUTED SYNCHRONIZATION AND TIMING SYSTEM FOR GENERATING LOCAL CLOCK SIGNAL BASED ON A DESIRED CLOCK SIGNAL EMBEDDED IN USB DATA STREAM

(75) Inventors: Peter Graham Foster, Kent Town (AU); Alex Kouznetsov, Oaklands Park (AU); Mykola Vlasenko, Northgate (AU)

(73) Assignee: ChronoLogic Pty Ltd, Adelaide (AU)

( * ) Notice: Subject to any disclaimer, the term of this patent is extended or adjusted under 35 U.S.C. 154(b) by 1063 days.

(21) Appl. No.: 12/279,328

(22) PCT Filed: Feb. 15, 2007

(86) PCT No.: PCT/AU2007/000155
§ 371 (c)(1),
(2), (4) Date: Jan. 21, 2009

(87) PCT Pub. No.: WO2007/092997
PCT Pub. Date: Aug. 23, 2007

(65) Prior Publication Data
US 2009/0222685 A1     Sep. 3, 2009

Related U.S. Application Data

(60) Provisional application No. 60/773,537, filed on Feb. 15, 2006.

(51) Int. Cl.
*G06F 1/04* (2006.01)
*G06F 13/00* (2006.01)

(52) U.S. Cl.
USPC ........................................ 713/500; 713/400

(58) Field of Classification Search
USPC ........................... 713/400, 401, 500; 375/371
See application file for complete search history.

(56) References Cited

U.S. PATENT DOCUMENTS 4,438,463 A * 3/1984 Sakamoto ..................... 386/314
5,058,050 A    10/1991 Ogita
(Continued)

FOREIGN PATENT DOCUMENTS

WO     2004/008330 A1     1/2004

OTHER PUBLICATIONS

Extended European Search Report mailed May 30, 2011, issued in corresponding European Application No. EP 07 70 186, filed Feb. 15, 2007, 10 pages.

(Continued)

*Primary Examiner* — Thomas Lee
*Assistant Examiner* — Phil Nguyen
(74) *Attorney, Agent, or Firm* — Christensen O'Connor Johnson Kindness PLLC

(57) ABSTRACT

A method and apparatus for controlling the phase and frequency of the local clock of a USB device, the apparatus comprising circuitry for observing USB traffic and decoding from the USB traffic a periodic data structure containing information about the frequency and phase of a distributed clock frequency, and phase and circuitry for receiving the periodic data structure and generating from at least the periodic data structure a local clock signal locked in both frequency and phase to the periodic data structure. The circuitry for receiving the periodic data structure and generating the local clock signal can generate the local clock signal with a frequency that is a non-integral multiple of a frequency of the periodic data structure.

18 Claims, 11 Drawing Sheets

(56) References Cited

U.S. PATENT DOCUMENTS

| | | | |
|---|---|---|---|
| 6,012,115 A | 1/2000 | Chambers | |
| 6,092,210 A | 7/2000 | Larky et al. | |
| 6,286,140 B1 | 9/2001 | Ivanyi | |
| 6,343,364 B1* | 1/2002 | Leydier et al. | 713/500 |
| 6,625,743 B1 | 9/2003 | Gulick | |
| 6,970,954 B1 | 11/2005 | Guy et al. | |
| 7,127,628 B2 | 10/2006 | Chang | |
| 2001/0011914 A1* | 8/2001 | Pomet | 327/165 |
| 2002/0010821 A1* | 1/2002 | Yu et al. | 710/100 |
| 2003/0086518 A1* | 5/2003 | Chakravarthy | 375/359 |
| 2003/0132861 A1* | 7/2003 | Shieh | 340/990 |
| 2004/0073807 A1 | 4/2004 | Youssef | |
| 2004/0088445 A1 | 5/2004 | Weigold | |
| 2005/0120157 A1 | 6/2005 | Chen et al. | |
| 2006/0023824 A1* | 2/2006 | Greco et al. | 375/371 |
| 2006/0064522 A1* | 3/2006 | Weigold et al. | 710/61 |
| 2006/0069939 A1* | 3/2006 | Fredriksson et al. | 713/400 |
| 2008/0101518 A1* | 5/2008 | Kaizuka | 375/371 |

OTHER PUBLICATIONS

Lesea, A., "Live. Via Satellite Transmission Clarity: The Frequency Derivation Aspect of Global Positioning Systems Is Essential for Timing Digital Network Elements," Technical White Paper, Feb. 1, 1998, CXR Larus, <http://www.cxrlarus.com/Date/Articles/TransmissionClarity/index.htm> [retrieved May 11, 2011], 3 pages.

* cited by examiner

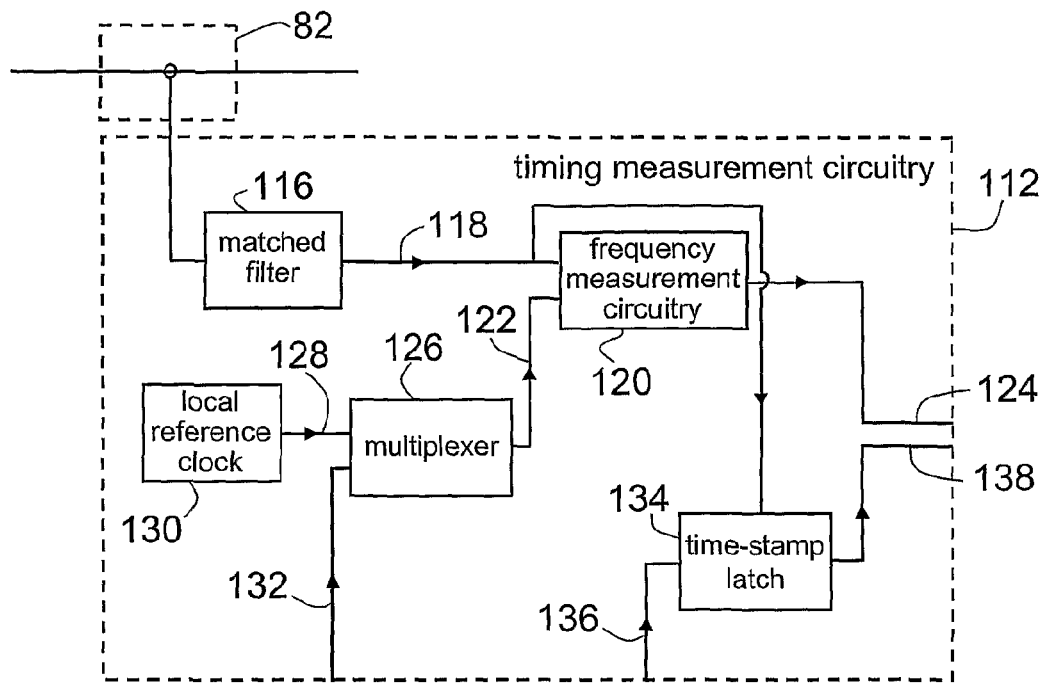
Figure 7
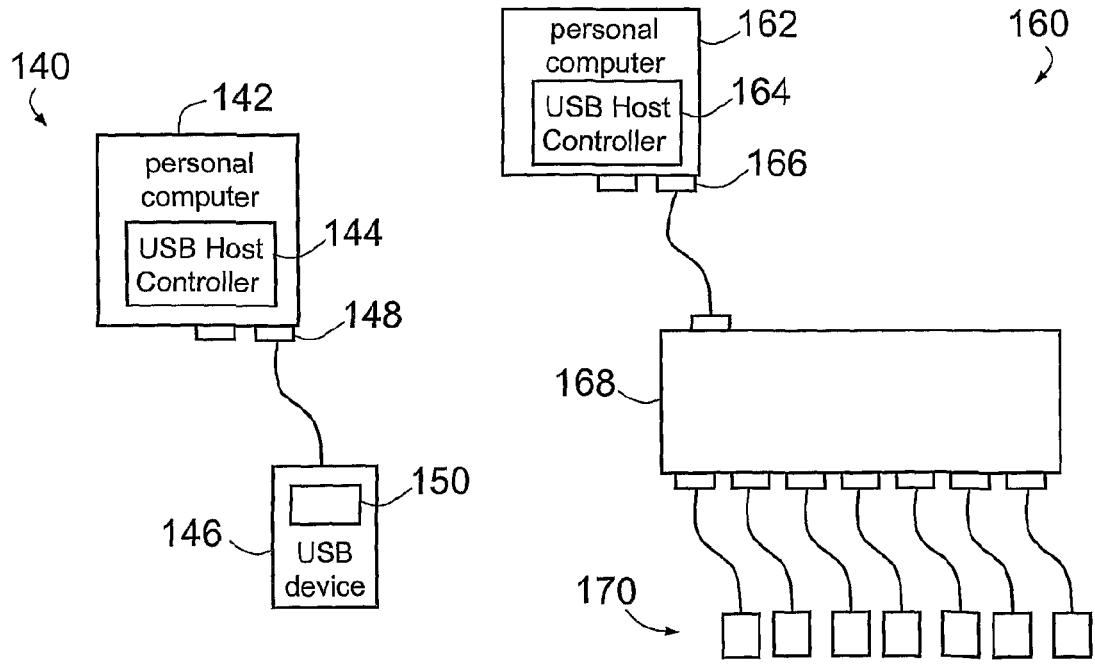
Figure 8
Figure 9

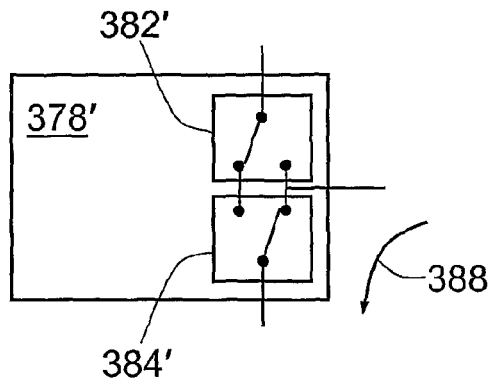
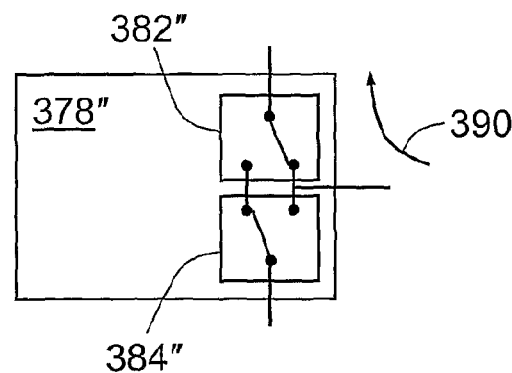
Figure 18A    Figure 18B
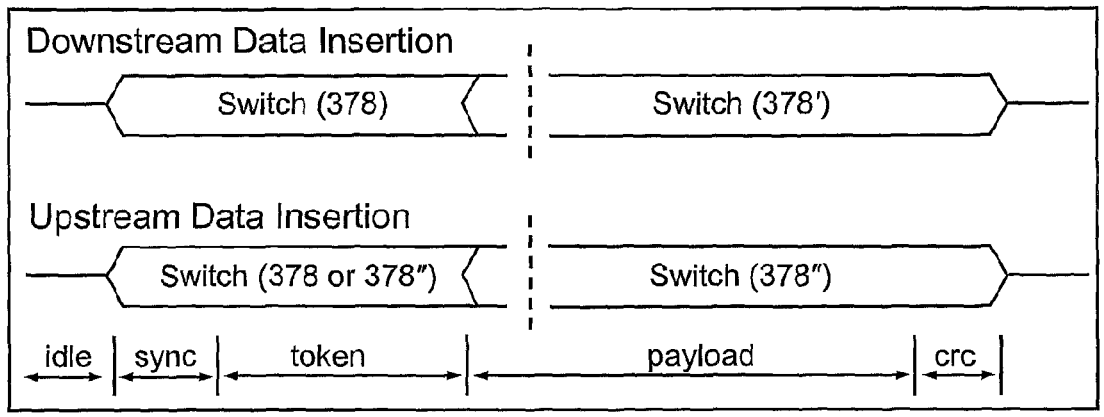
Figure 18C
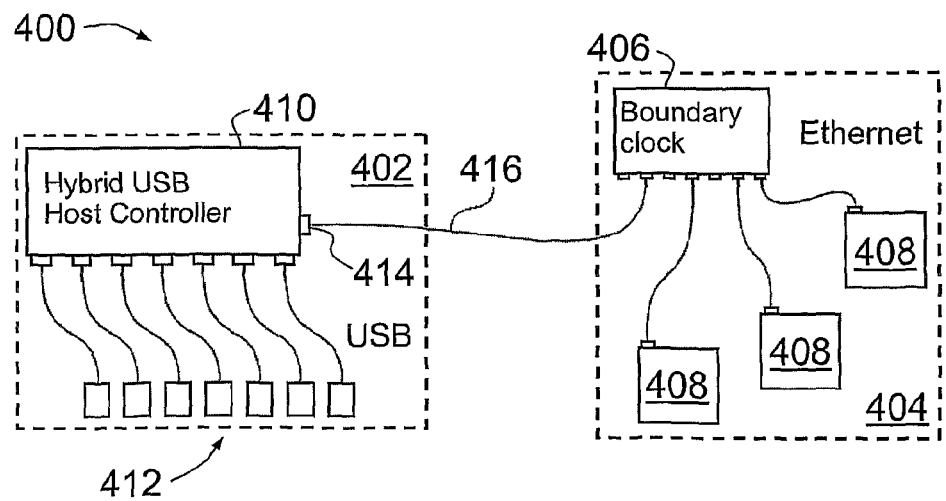
Figure 19

DISTRIBUTED SYNCHRONIZATION AND TIMING SYSTEM FOR GENERATING LOCAL CLOCK SIGNAL BASED ON A DESIRED CLOCK SIGNAL EMBEDDED IN USB DATA STREAM

RELATED APPLICATION

This application is based on and claims the benefit of the filing date of U.S. application No. 60/773,537 filed 15 Feb. 2006, the content of which is incorporated herein by reference in its entirety.

FIELD OF THE INVENTION

The present invention relates to a method and apparatus for providing a distributed synchronization and timing system, of particular but by no means exclusive use in providing clocks, data acquisition and control of test and measurement equipment, instrumentation interfaces and process control equipment, synchronized to an essentially arbitrary degree.

BACKGROUND OF THE INVENTION

The USB specification is intended to facilitate the interoperation of devices from different vendors in an open architecture. USB data is encoded using differential signalling (viz. two wires transfer the information) in the form of the difference between the signal levels of those two wires. The USB specification is intended as an enhancement to the PC architecture, spanning portable, desktop and home environments.

The USB specification assumes that devices differ. This is true for the intended environments in which devices from a multiplicity of manufacturers are connected, but there exist other environments (such as certain common industrial or laboratory environments) that require a specification for operating multiple devices of a similar nature in a synchronized manner. The specification does not sufficiently address this issue. Such environments are typically those where testing, measuring or monitoring is performed, and which require the devices to be synchronized to a more accurate degree than is specified. The USB specification allows limited inter-device synchronization by providing a 1 kHz clock signal to all devices. However, many laboratory and industrial environments require synchronization at megahertz frequencies and higher.

USB employs a tiered star topology, where hubs provide attachment points for USB devices. The USB host controller which is located on the user's personal computer (PC), laptop or personal digital assistant (PDA) contains the root hub, which is the origin of all USB ports in the system. The root hub provides a number of USB ports to which USB functional devices or additional hubs may be attached.

In turn, one can attach more hubs (such as USB composite device) to any of these ports, which then provide additional attachment points via ports for further USB devices. In this way, USB allows a maximum of 127 devices (including hubs) to be connected, with the restriction that any device may be at most 5 levels deep.

The root hub in the host transmits a Start of Frame (SOF) signal packet every 1 ms to every device, the time between two SOF packets being termed a frame. Each module receives this SOF packet at a different time, allowing for electrical delays inherent in USB topology. The topology implies that there may be a significant time delay (specified as ≤380 ns) for receiving the same signal between a device that is connected directly to the host controller and a device, which is 5 levels down. This is a severe restriction when there is a need to synchronize devices at megahertz levels and above. Furthermore the USB specification allows the host controller to fail to transmit up to five consecutive SOF tokens.

Current synchronization between a USB host and a USB device is possible by two types of USB transfers, Interrupt and Isochronous. Interrupt transfers allow guaranteed polling frequencies of devices with minimum periods of 125 μs, whereas isochronous transfers guarantee a constant transfer rate. Both methods require there to be traffic between the device and host for synchronization to take place and therefore reserve more bandwidth for higher degrees of synchronization. This unfortunately means that the available USB bandwidth can be used up before the maximum number of devices has been connected. This approach also places on the host the great computational burden of keeping 127 devices synchronized to the host by means of software, yet still fails to address maintaining synchrony between the devices as to the host the individual devices represent separate processes.

Devices that contain a physical transducer of some kind, such as a laser diode or a photodetector, may require clock and trigger information. Such devices, such as a laser diode with a modulated light output at 1 MHz, may use a clock signal to perform transducer functions at regular intervals or at a constant frequency. A trigger signal is usually used to start or end an operation at a set time. In the laser diode example, a trigger signal could be used to turn the modulated light output on or off.

These clock and trigger signals or information (referred to below as synchronization information) can be used to synchronize a multiplicity of devices to each other, provided the signals are common and simultaneous to all devices. 'Common' and 'simultaneously' here mean that the variation in time of these signals between the devices is less than a specified quantity, δt. In the laser diode example, this would enable a multiplicity of laser diodes to modulate their light output at one frequency. The modulation frequency of all devices would be the same, and their waveforms would be in-phase. The current USB specification (viz. 2.0) allows for delays in δt of up to 0.35 μs. For a signal with a frequency of 1 MHz and a period of 1.0 μs, this delay represents almost half of the period. It is thus unusable as specified as a synchronization signal for routine use.

Devices like hubs and USB controller chips commonly use some amount of phase locking in order to decode the USB protocol. It is the purpose of the SYNC pattern in the USB protocol to provide a synchronization pattern for another electronic circuit to lock to. However, this is intended to synchronize the device to the USB bit streams to an accuracy sufficient to interpret MHz bit streams. It is not intended to synchronize two separate devices with each other to an accuracy required by many test and measurement instruments. The USB specification—to the extent that it deals with inter-device synchronization—is mainly concerned with synchronizing a USB-CD audio stream sufficiently for output on a USB-speaker pair. The requirements of such an arrangement are in the kHz range and, for this, the USB provides ideal conditions. However, the specification does not address the potential problems of synchronizing 100 USB-speaker pairs.

As discussed above, USB communication transfers data during regular 1 ms frames or—in the case of the High-Speed USB specification—in eight micro-frames per 1 ms frame. A Start of Frame (SOF) packet is transmitted to all but Low-Speed devices at the beginning of each frame and to all High-Speed devices at the beginning of each micro-frame.

The SOF packet therefore represents a periodic low resolution signal broadcast to all but Low-Speed devices connected to a given Host Controller.

This SOF packet broadcast occurs at a nominal frequency of 1 kHz. However the USB specification allows a very large frequency tolerance (by instrumentation standards) of some 500 ppm (parts per million). The background art utilises this low resolution frequency signal that is broadcast to each of the devices to provide clock synchronization, but only to the somewhat ambiguous frequency provided by the USB Host Controller.

U.S. Pat. No. 6,343,364 (Leydier et al.) discloses an example of frequency locking to USB traffic, which is directed toward a smart card reader. This patent teaches a local, free-running clock that is compared to USB SYNC and packet ID streams; its period is updated to match this frequency, resulting in a local clock with a nominal frequency of 1.5 MHz. This provides a degree of synchronization sufficient to read the smart card information into the host PC.

As this approach is directed to a smart card reader, inter-device synchronization is not addressed. Further, neither a frequency lock to 1 kHz or better stability nor high accurate phase control is disclosed.

U.S. Pat. No. 6,012,115 and subsequent continuation U.S. Pat. No. 6,226,701 (Chambers et al.) addresses the USB SOF periodicity and numbering for timing. As explained in the abstracts of these disclosures, the invention allows a computer system to perform an accurate determination of the moment in time a predetermined event occurred within a real-time peripheral device by using the start of frame pulse transmitted from a USB host controller to peripheral devices connected to it.

However these approaches do not measure the frequency of a periodic data structure contained within the USB data traffic for determination of the absolute frequency of the master clock in the USB Host Controller, and in some cases rely on the provision of an additional counter in the host.

U.S. Pat. No. 6,092,210 (Larky et al.) discloses a method for connecting two USB hosts for the purpose of data transfer, by employing a USB-to-USB connecting device for synchronizing local device clocks to the data streams of both USB hosts. Phase locked loops are used to synchronize local clocks and over-sampling is used to ensure that data loss does not occur. This document, however, relates to the synchronization of the data streams of two USB hosts with each other (and with limited accuracy) such that transfer of information is then possible between said Hosts. The invention does not teach about the synchronization of a multiplicity of USB devices to a single USB Host or to a plurality of USB hosts.

The USB specification was written with audio applications in mind, and U.S. Pat. No. 5,761,537 (Sturges et al.) describes how to synchronize two or more pairs of speakers with individual clocks, where one pair operates off a stereo audio circuit in the PC and the other pair is controlled by the USB. Since both speaker pairs use their own clocks, they need to be synchronized so this document teaches one technique for maintaining synchronization of the audio signals despite possible clock skew between the asynchronous clocks.

U.S. patent application Ser. No. 10/620,769 discloses a synchronized version of the USB, in which the local clock of each device is synchronized on a given USB to an arbitrary degree. This document also discloses a method and apparatus for providing a trigger signal to each device within the USB such that an event may be synchronously initiated on multiple devices by the trigger signal.

U.S. Pat. No. 6,904,489 (Zarns) discloses methods and systems for remotely accessing a USB device, in which a requesting device (such as a personal computer) issues a request for a USB device, the request is intercepted and packaged and then transmitted over a network. The packet is received by a USB host device, and the request is unpackaged and passed to the controller for processing by the USB device.

FIG. 1 is a schematic diagram of an exemplary background art synchronized USB device 10, connected to a digital USB 12, a clock signal and synchronization bus 14, and including a digitally controlled transducer 16. The device 10 also includes a bus connector 18, digital I/O bus interface circuitry 20, a microprocessor 22, and synchronization channel 24 for passing synchronization information including trigger and clock signals to the transducer 16.

The device 10 is connected by means of the bus connector 18 to a digital USB 12 containing USB data and control signals for the USB device 10; clock signal and synchronization bus 14 provides clock and synchronization signals.

Another synchronized USB device, disclosed in U.S. patent application Ser. No. 10/620,769, is shown schematically at 10' in FIG. 2. Like reference numerals have been used to refer to like features in FIG. 1. In device 10', clock signals are generated locally to the synchronized USB device 10' by decoding information present in the data stream of USB 12, through bus connector 18. In this device, all synchronization is provided through USB 12 using standard USB cables and connectors (rendering the clock signal and synchronization bus 14 of FIG. 1 unnecessary). Synchronization channel 26 provides synchronization information including trigger and clock signals to digital transducer 16.

This architecture for synchronization of the local clock on each of a plurality of USB devices relies on periodic data structures present in the USB traffic. The preferred embodiment of U.S. patent application Ser. No. 10/620,769 essentially locks the local clock in frequency and phase to the detection of a SOF packet token at the USB device.

FIG. 3 is a schematic representation of another embodiment of U.S. patent application Ser. No. 10/620,769. In this embodiment, a synchronization channel 26 operates by detecting and extracting information from a USB 12 as USB signal traffic passes through to digital I/O bus interface circuitry 20 (not shown in this figure), and by generating both a local clock signal 28 and a local trigger signal 30.

This embodiment employs circuitry to observe traffic through the USB and decode all SOF packets, which results in a pulse once every 1 ms. The local clock signal 28, from a controlled oscillator clock 32, is locked to the reception of the USB 1 kHz SOF packet in both phase and frequency.

This first requires the local high speed clock signal 28 from clock 23—which may be, say, 1 MHz—to be divided by a clock frequency divider 34 down to the frequency of the SOF packet reception (nominally at 1 kHz). Matched filter 36 sends a clock synch signal 38 when a SOF packet arrives, which passes to a phase detector 40. The phase detector 40 is coupled to the controlled oscillator clock 32 via a filter 42.

The local clock signal 28 is subsequently supplied to the transducer circuitry on the USB device (i.e. digital transducer 16 in FIGS. 1 and 2), thus ensuring that all devices attached to the root hub are locked in frequency to the point at which they receive the SOF packet token.

This arrangement is said to be able to produce a local clock signal to arbitrarily high frequencies, such as a clock frequency of tens of megahertz, and thereby to ensure that the local clock of each device connected to a given USB is synchronized in frequency. U.S. patent application Ser. No. 10/620,769 also teaches a method and apparatus to further synchronize multiple local clocks in phase by measurement of signal propagation time from the host to each device and provision of clock phase compensation on each of the USB devices.

However, the approach described in patent application Ser. No. 10/620,769 is limited in its ability to provide a precisely known clock frequency to each device. The arrangement described above by reference to FIG. 3 locks the frequency of each local clock to the reception of the SOF packet token. The rate of SOF packet generation is driven by the local crystal oscillator on a host PC. This is generally inaccurate and the USB specification has a very large tolerance on clock frequency and subsequent SOF rate. The USB specification dictates that the host controller must send a SOF packet at a rate of 12 MHz±500 ppm (parts per million), that is, 12 MHz±0.05%.

This is a very large tolerance for clocks. For example, a standard crystal oscillator has a central frequency tolerance of approximately 20 ppm with temperature stability of approximately±50 ppm across the usable temperature range. Even this tolerance is unacceptable for highly accurate clock systems. Time critical systems often require temperature stabilised crystal oscillators with centre frequency tolerance and temperature stability of approximately 5 ppm or better.

U.S. patent application Ser. No. 10/620,769 also teaches a method of controlling the synchronized USB clock frequency by manufacture of a special USB host controller with local clock of precisely controlled reference frequency. Such a system would then produce a USB data stream with 1 kHz SOF clock accuracy of a few parts per million. This device is likely to be too costly to see widespread implementation in the highly competitive personal computer market; further, systems such as laptop computers and PDAs (personal digital assistants) have no provision to add on an aftermarket USB host controller.

U.S. Pat. No. 6,226,701 (Chambers et al.) discloses a system for time-stamping real-time events within a USB, employing multiple counters and comparing elapsed time since USB SOF packets. This system requires a counter in both the USB device and the USB Host Controller to be activated by SOF tokens. The counter in the device is activated by the external event and stopped by the next SOF. The counter in the Host controller is reset and started by each SOF. The USB host controller interrogates the peripheral device which transfers data to the host controller indicating (i) that an event has occurred, and (ii) the time before start of frame value of the first timer. The USB host controller interrupts the host processor and transfers to it the data related to the peripheral device. In this way the system of this document can determine the elapsed time since the external event occurred and the processor read the second timer.

However, while the system of Chambers et al. can perform basic event time-stamping, it requires a specific hardware implementation of the USB Host Controller and is therefore not compatible with a generic implementation of USB. Furthermore, that system relies on PC interrupt features and the associated timing restrictions of the real-time clock of the Host PC.

SUMMARY OF THE INVENTION

Thus, it is an object of this invention to supplement the USB specification such that any number of USB devices, up to some allowed maximum, can operate in a synchronized and triggered manner with local clocks both phase and frequency locked to precisely controlled arbitrary frequencies.

It is another object of the invention to retain the advantages of USB while supplementing the USB specification, including the ability to operate multiple devices via a tiered star architecture (up to a current total of 127 devices), hot-swap capability, automatic enumeration, ease-of-use, cross-operating system compatibility, and portability.

It is yet another object of this invention to provide highly accurate time-stamping of the events of a real-time system with generic implementation of USB Host controller hardware applicable to every USB.

In a first broad aspect, the invention provides a method and apparatus for controlling the phase and frequency of the local clock of a USB device, the apparatus comprising:
  circuitry for observing USB traffic and decoding from the USB traffic a periodic data structure containing information about frequency and phase of a distributed clock frequency and phase; and
  circuitry for receiving the periodic data structure and generating from at least the periodic data structure a local clock signal locked in both frequency and phase to the periodic data structure.

Thus, the periodic structure acts as a carrier for clock information, without itself constituting the clock frequency information. The clock may either be of the same frequency as the carrier or a different frequency according to any number of additional signals used to modify the carrier signal frequency.

Indeed, the local clock signal can be generated with a frequency that is a non-integral multiple (including sub-multiple) of that of the periodic structure/carrier signal; this is also the case in other aspects of the invention described below. That is, the local clock signal need not be generated with a frequency that is a fixed multiple of the frequency of the periodic structure/carrier signal, but rather with a frequency that is calculated based on the actual frequency of the periodic structure/carrier signal. For example, if the frequency of the periodic structure/carrier signal is 1.01 kHz, according to the present invention it is possible to synchronize to substantially exactly 10 MHz (rather than to an integral multiple, such as 10.1 MHz).

The circuitry for receiving the periodic data structure and generating a local clock signal may also be adapted to receive an information signal (such as from a microcontroller) and to generate the local clock signal from at least the periodic data structure and the information signal.

The circuitry for receiving the periodic data structure and generating a local clock signal may include a phase comparator, a controlled oscillator clock generator and frequency synthesis circuitry for generating a clock signal of arbitrary frequency.

Preferably the periodic data structure comprises a USB Start of Frame (SOF) packet token.

According to a second broad aspect, the invention further provides a method for generating a local clock signal, comprising:
  measuring a frequency of a periodic data structure (such as the SOF packet token) in a USB data stream.

In one embodiment, the method further comprises determining a clock rate of a USB host controller from the frequency of the periodic data structure.

According to this broad aspect, the invention also provides an apparatus for generating a local clock signal, comprising:
  a USB adapted to receive a USB data stream;
  a reference signal source for providing a reference signal; and
  timing circuitry for comparing a periodic data structure in the USB data stream (such as the SOF packet tokens) with the reference signal and determining the frequency of the periodic data structure.

Thus, in this aspect the frequency of the periodic data structure can be determined, which may itself be used to determine, for example, the clock rate of a USB host controller.

The USB may receive the USB data stream wirelessly, or the apparatus may include a USB bus connector for connection to the USB and for transmitting the USB data stream to the USB.

The apparatus will commonly be in the form of a USB device, but need not be.

The apparatus may be adapted to measure the frequency of the periodic data structure in only one of a plurality of devices and be configured to transmit a signal to other devices to control their local clocks accordingly.

The reference signal or frequency source (in this and other embodiments) may comprise either a local reference clock or an external reference signal source (such as a connector for connection to an external reference clock). If an external reference clock is employed in this regard, it may be of arbitrarily high accuracy, and could be in the form of, for example, a precision frequency reference (such as a Caesium or Rubidium clock), a Global Positioning System (GPS) time server or an IEEE-1588 time server.

The apparatus may include a time-stamp latch and a reference time-stamp signal source, wherein the time-stamp latch is adapted to time stamp a data signal from the reference time-stamp signal source, whereby the time-stamp information can be synchronized to the reception of the carrier signal.

The reference time-stamp signal source may comprise a connector for connection to an external reference time-stamp signal source.

In a third broad aspect, the invention provides an apparatus for determining the clock rate of a USB host controller, comprising:
    a USB hub attachable to the USB host controller;
    a reference signal source for providing a reference signal;
    a USB device attached to the USB hub and having timing circuitry for comparing a periodic data structure in the USB data stream with the reference signal and determining the frequency of the periodic data structure so that an estimate of the clock rate can be made.

Preferably the apparatus comprises a plurality of USB devices attached to the USB hub, each having timing circuitry for comparing a periodic data structure in the USB data stream with the reference signal and determining the frequency of the periodic data structure, and the apparatus is operable to make respective estimates of the clock rate, wherein the apparatus further comprises a data processor for receiving the respective estimates of the clock rate and for determining the clock rate of the USB host controller from (such as by statistical analysis of) the estimates.

The apparatus may make the estimates of the clock rate in the timing circuitry of the respective USB devices, or in the data processor, or otherwise.

The reference signal source may be of arbitrarily high accuracy, and could be in the form of, for example, a common Global Positioning System (GPS) time server or of a respective GPS time server corresponding to each USB device.

Thus, a GPS time server can provide a reference clock signal to an arbitrary precision and phase accuracy to an arbitrary precision across the earth, but any other reference clock signal (preferably externally provided) is suitable. It should also be understood that any external distributed reference timing system (such as the synchronous Ethernet standard known as IEEE-1588) may also be used as the clocking reference source for ensuring a widely distributed synchronous USB system.

In a fourth broad aspect, the invention provides a synchronized USB for synchronizing a plurality of USB devices, comprising:
    an external reference clock signal provided to the plurality of USB devices enabling them to each synchronize themselves to the external reference clock signal (and by implication to one another).

Thus, according to this aspect, an essentially unlimited number of USB devices can be synchronized, so that the synchronous channel count of a synchronized USB can be increased beyond the present limit of 127 devices (including hubs) imposed by the USB specification. This enables the USBs to each synchronize themselves to that external reference signal.

According to this aspect of the invention, there is provided a method of synchronizing a plurality of USB devices, comprising:
    providing an external reference clock signal to the plurality of USB devices; and
    the USB devices synchronizing themselves to the external reference clock signal (and by implication to one another).

The method may include synchronizing events on a plurality of synchronized USBs. Preferably the method includes communicating information to a further plurality of USB devices on said USB devices such that said further USB devices are triggered to execute commands or functions in real-time and as required by an operator.

Thus, according to this method, to extend the number of devices and the physical separation of devices that USB can support in a synchronized system can be extended. USB can currently support 127 devices (including hubs) and with few exceptions is limited to a range of 30 m. In this aspect a GPS or IEEE-1588 signal (for example) can be used as the local timing reference for a plurality of USBs, so an essentially unlimited number of devices may be included in the system with no restriction on their locations. Hence, a globally synchronized system may be provided.

In a fifth broad aspect, the invention provides a method for reducing communication latency of a USB (such as for time critical applications, including control applications), comprising:
    monitoring and decoding upstream USB data traffic associated with the USB;
    extracting specific information packets from said upstream information; and
    initiating at least one action according to content of the specific information packets.

The specific information packets may be processed by a local processor before being acted upon.

In one embodiment, the action includes communicating with one or more other devices (that is, outside the USB environment). This communication may include transmitting data to the other devices. The data may be communicated through any communication channel, including a serial communication channel, a parallel communication channel, a wired communication channel, a fiber optic communication channel, and a wireless communication channel.

This aspect also provides a USB with reduced latency, comprising:
    a USB device with an upstream port; and
    a data decoder and processor for observing USB data traffic on the upstream port, decoding data structures present in the USB traffic, and initiating at least one action according to content of the data structures.

Thus, according to this aspect, a new class of USB control device is possible whereby the usual limitations of latency on the USB are reduced.

In a sixth broad aspect, the invention provides a synchronized multichannel USB synchronizable to a synchronized Ethernet, comprising:
  a USB host system;
  a synchronized multichannel USB;
a plurality of USB devices coupled to the USB host system, each having a local clock and an absolute time register;
  wherein the local clocks of the USB devices are synchronized in frequency and phase, the absolute time registers of the USB devices are synchronized and clocked by the respective local clock, and the USB includes a synchronization channel whereby clock frequency and time stamp information can be communicated between the synchronized USB and the synchronized Ethernet and a data channel for data communication with the synchronized Ethernet.

The synchronization channel may comprise one or more USB devices attached to the synchronized USB, a compound USB Hub and USB device function, or a device that observes USB data traffic on the synchronized USB but is not an attached member of the synchronized USB.

In another broad aspect, the present invention provides a USB device, comprising at least one (and in some embodiments more than one) local clock, wherein the local clock is synchronized to the USB, whereby the local clock can be controlled to an arbitrarily precise frequency and phase.

The USB device may include a synchronizer for synchronizing the local clock with a carrier signal contained within a USB data stream, wherein accuracy of a local clock frequency and phase is not limited by an accuracy of a USB Host Controller clock. In this (and other embodiments), the carrier signal may comprise USB data OUT tokens, IN tokens, ACK tokens, NAK tokens, STALL tokens, PRE tokens, SOF tokens, DATA0 tokens, DATA1 tokens or programmable bit pattern sequences in the USB data packets.

It should be noted that the various features of each of the above aspects of the invention can be combined as desired.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWING

In order that the present invention may be more clearly ascertained, embodiments will now be described, by way of example, with reference to the accompanying drawing, in which:

FIG. 7 is a schematic diagram of the timing measurement circuitry of the USB synchronizing device of FIG. 6;

FIG. 8 is a schematic diagram of a USB system according to a third embodiment of the present invention;

FIG. 9 is a schematic diagram of a USB system according to a fourth embodiment of the present invention;

FIGS. 18A, 18B and 18C schematically illustrate the data insertion switch and method used in the USB monitoring circuitry of FIG. 17 to insert payload data into a USB data stream;

FIG. 19 is a schematic diagram of a USB with Hybrid USB Host Controller synchronized to an Ethernet according to a tenth embodiment of the present invention;

DETAILED DESCRIPTION OF THE INVENTION

Figure 1:
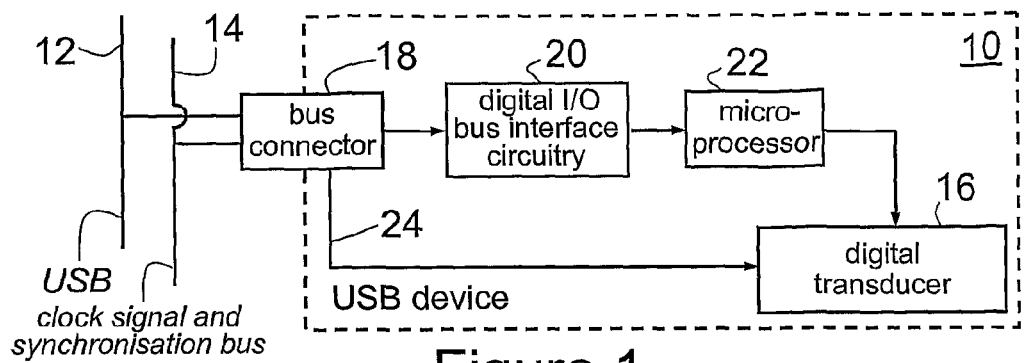
FIG. 1 is a schematic diagram of a background art synchronized USB device.
Figure 2:
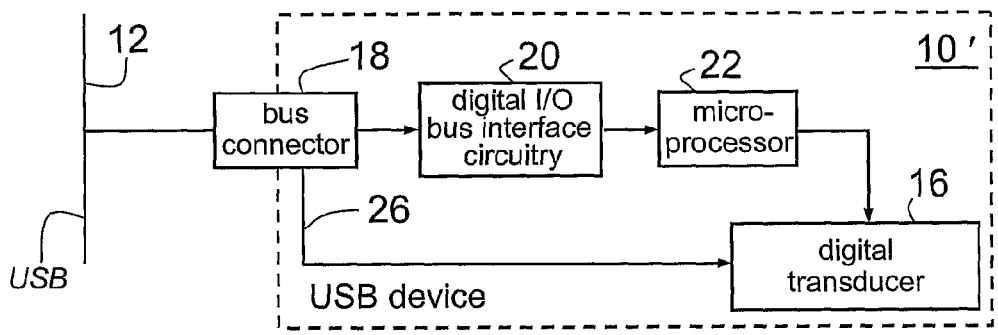
FIG. 2 is a schematic diagram of another background art synchronized USB device.
Figure 3:
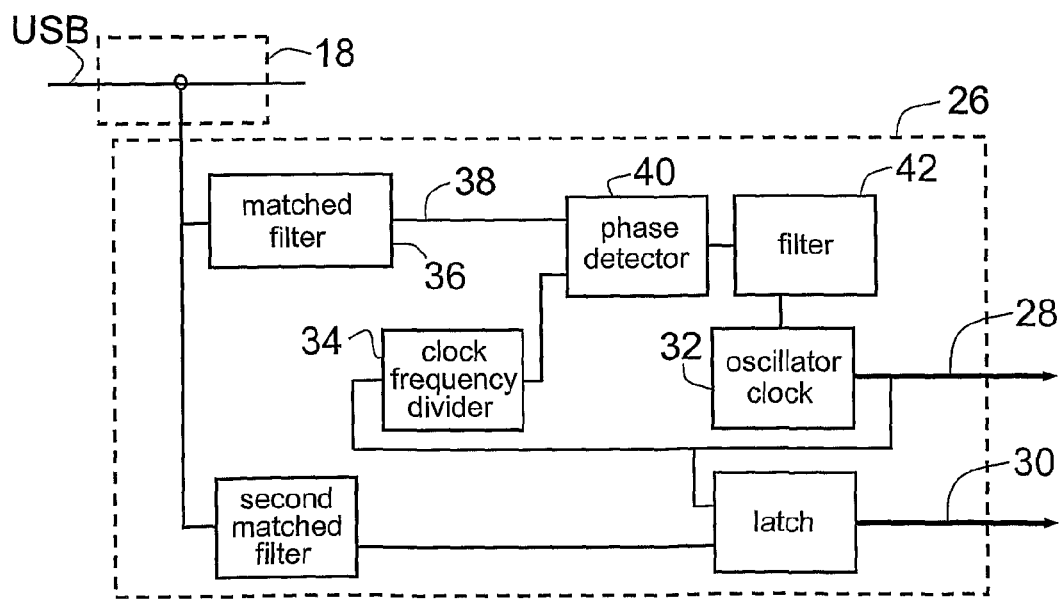
FIG. 3 is a schematic diagram of the details of background art synchronized USB circuits.
Figure 4:
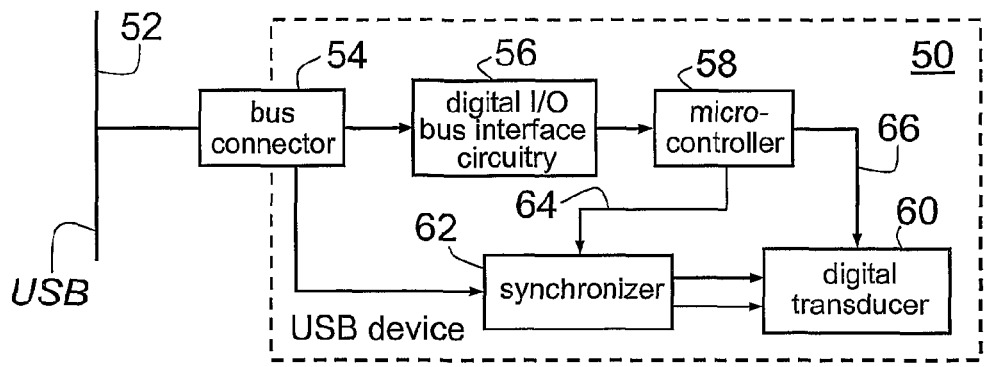
FIG. 4 is a schematic diagram of a synchronized USB device according to a first embodiment of the present invention.

A USB device according to a first embodiment of the present invention is shown schematically at 50 in FIG. 4, with a USB 52. In this embodiment, clock synchronization information to allow the local clock of the USB device 50 to be frequency controlled to an arbitrary degree is passed to the USB device by a carrier signal (described below) that is then decoded from the USB data stream.

Referring to FIG. 4, USB device 50 includes a bus connector 54, digital I/O bus interface circuitry 56, a microcontroller 58, a digitally controlled transducer 60 and synchronization circuitry in the form of synchronizer 62 (described in greater detail below). The digital I/O bus interface circuitry 56 acts as a transceiver for USB data detected at bus connector 54, passing the USB data to microcontroller 58. The microcontroller 58 provides information 64 to synchronizer 62 for accurate frequency synthesis and a direct control channel 66 to digitally controlled transducer 60.

The carrier signal referred to above is a periodic data structure and hence usable as a carrier signal; in this and the other embodiments described below it is in the form of the SOF packet token, which provides a periodic low resolution signal of ambiguous frequency that is broadcast to all but Low-Speed devices connected to a given Host Controller. The carrier signal, once decoded from the USB traffic, is combined with a scaling factor to generate synchronization information and hence to synthesize a local clock signal with precise control of the clock frequency.

Figure 5:
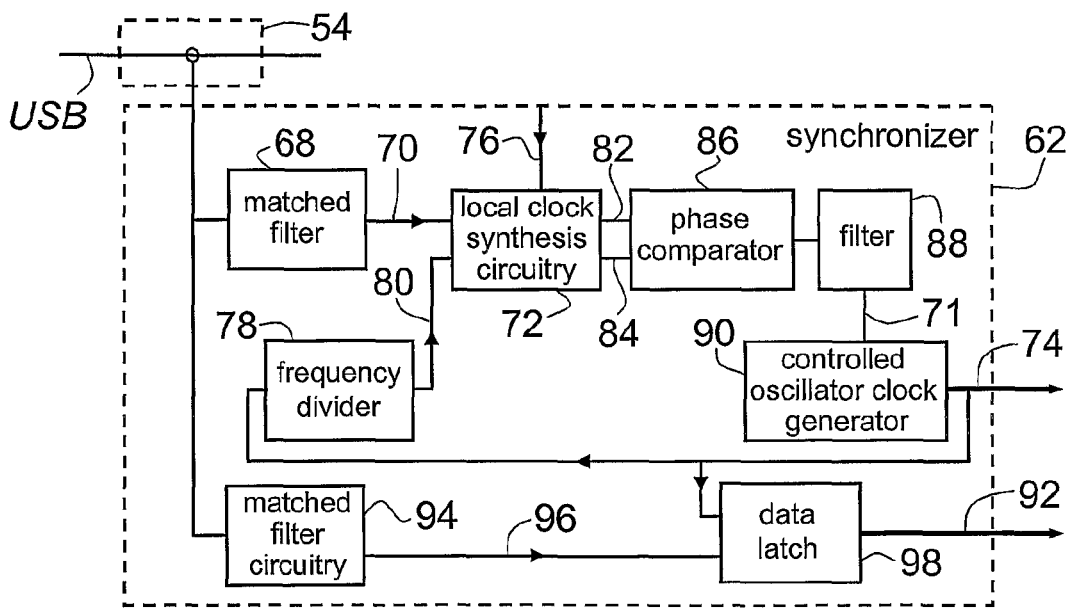
FIG. 5 is a schematic diagram of the synchronization channel of the synchronized USB device of FIG. 4.

Thus, FIG. 5 is a detailed schematic diagram of the synchronizer 62 of this embodiment. Synchronizer 62 includes a matched filter 68 to observe USB traffic through bus connector 54, decode the aforementioned periodic carrier signals (in the form, in this embodiment, of SOF packet tokens) and send a clock synchronization signal 70 to local clock synthesis circuitry 72.

A frequency-accurate local clock signal 74 is synthesized from the decoded carrier signal (i.e. clock synchronization signal 70), using information signal 76 provided by microcontroller 58. In this embodiment (and typically) local clock signal 74 has a frequency several orders of magnitude higher than has clock synchronization signal 70 and is divided down by a frequency divider 78 to a divided signal 80 of frequency closer to that of clock synchronization signal 70.

Local clock synthesis circuitry 72 manipulates its input signals (i.e. clock synchronization signal 70 and divided signal 80) according to information signal 76 provided by microcontroller 58. The resulting two output signals 82 and 84 are passed to a phase comparator 86. The phase comparator 86 is coupled via a filter 88 to a controlled oscillator clock generator 90.

Accurate local clock signal 74 is then used as clock signal for trigger circuitry to generate a phase accurate trigger signal 92. Synchronizer 62 includes a further matched filter 94 that also decodes USB data received through the USB bus connector 54 and produces a trigger enable signal 96 upon detection of the required trigger signal from the USB data stream. The trigger enable signal 96 is passed to a data latch 98, which uses the local frequency accurate clock signal 74 to clock the trigger enable signal 96 through to form phase accurate trigger signal 92.

According to this embodiment, therefore, it is possible to produce a clock signal stable to arbitrarily high frequencies, such as a clock frequency of tens of megahertz with stochastic jitter as low as a few nanoseconds or less, and with arbitrarily high frequency accuracy.

As discussed above, the SOF packet broadcast occurs at a nominal frequency of 1 kHz but the actual frequency of this signal is determined by the accuracy of the USB Host Controller clock. A USB device 100 according to a second embodiment of the invention employs a method for determining the effective clock rate of the USB Host Controller by accurately measuring the frequency of the SOF packet. This signal can then be considered a carrier for information about the Host Controller clock rate and the carrier signal is broadcast to all connected USB devices. The carrier signal embedded in the normal USB protocol is thus decoded and its frequency measured to determine the effective clock rate of the USB Host Controller clock.

Figure 6:
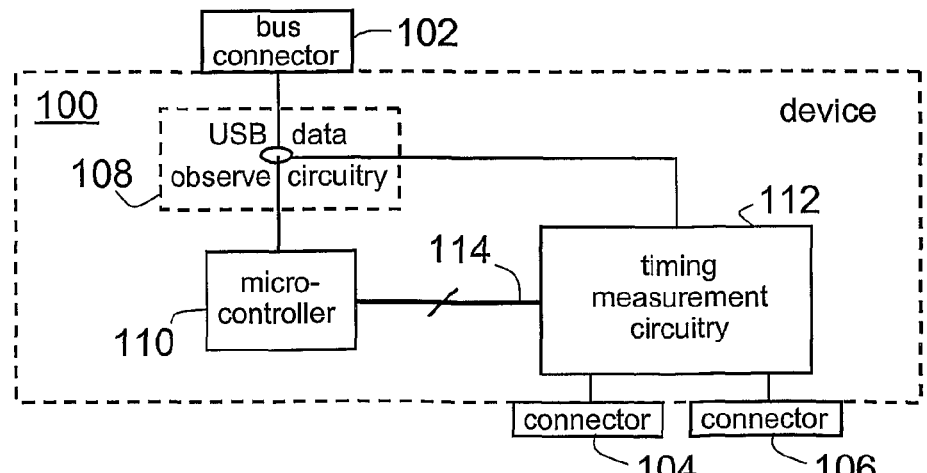
FIG. 6 is a is a schematic diagram of a device for synchronizing a USB according to a second embodiment of the present invention.

Thus, FIG. 6 is a schematic diagram of a device 100 for synchronizing a USB according to a second embodiment of the invention, which includes a USB bus connector 102 for connection to a USB. Device 100 has a first connector 104 for receiving an external reference clock signal, and a second connector 106 for receiving an external reference time-stamp signal, by mean of which device 100 measures the frequency of the SOF packet signal (or carrier signal). Device 100 includes USB monitoring circuitry 108 to observe the USB data stream, a microcontroller 110, timing measurement circuitry 112 and information bus 114 (incorporating an analog and/or a digital bus) for communication between microcontroller 110 and timing measurement circuitry 112.

Although device 100 determines the SOF packet carrier signal frequency and by implication the USB Host Controller frequency, and can pass information about the frequency back to a microcontroller and indeed back to a host PC, it will be apparent to those skilled in the art that this approach may also be used with non-USB devices. For example, this approach may be used in a device that merely detects and decodes a USB data stream but is not a USB device.

Although device 100 determines the SOF packet carrier signal frequency, it will be apparent to those skilled in the art that both the connector for receiving external reference clock signal 104 and the connector for receiving external reference time-stamp signal 106 can be bidirectional ports. Such bidirectional ports can transmit or receive clock and data signals (including time-stamp information) to or from an external device. It will also be apparent to those skilled in the art that such signals can be used for controlling external devices.

FIG. 7 is a more detailed schematic diagram of the timing measurement circuitry 112. Timing measurement circuitry 112 includes a matched filter 116 for decoding the carrier synchronization signal in the USB data stream to output a decoded carrier signal 118, and frequency measurement circuitry 120 that compares decoded carrier signal 118 with a local reference signal 122. The frequency measurement circuitry 120 produces clock accuracy information signal 124 indicative of the absolute clock accuracy of the carrier signal and hence indicative of the clock rate of the USB Host Controller. (This clock accuracy information signal 124 is passed through information bus 114 of FIG. 6.) Local reference signal 122 is provided by multiplexer 126, which selects either local reference clock signal 128, generated by local reference clock 130, or an external reference signal 132 (provided by first connector 104), as controlled by microcontroller 110 through information bus 114.

The decoded carrier signal 118 is also used by time-stamp latch 134, which time stamps a data signal 136 received from external time-stamp second connector 106, and output at 138 to information bus 114. In this way, absolute time-stamp information from an external source can be synchronized to the reception of the carrier signal.

FIG. 8 is a schematic diagram of a USB system 140 according to a third embodiment of the present invention, in which a personal computer 142 with a USB Host Controller 144 is attached to a single USB device 146 at a USB 148. The USB device 144 contains timing measurement circuitry 150 (as per timing measurement circuitry 112 of FIG. 7) to measure repetitive carrier signal frequency using an internal reference clock (comparable to local reference clock 130 of FIG. 7) to an arbitrary degree. Thus, in this embodiment the absolute frequency of the clock carrier signal of the USB Host Controller 144 is determined by means of circuitry (i.e. the timing measurement circuitry 150) contained solely within a USB device. Further, it will be apparent to those skilled in the art that, although this embodiment includes a personal computer, alternative similar embodiments may instead include any device, such as a personal digital assistant (PDA) or mobile communication device, that contains a USB host controller or USB on-the-go controller.

FIG. 9 is a schematic diagram of a USB system 160 according to a fourth embodiment of the present invention, in which personal computer 162 with a USB Host Controller 164 is attached to a USB hub 166 at a USB 168. USB Hub 168 provides connectivity to a plurality of USB devices 170, each of which contains timing measurement circuitry (comparable to timing measurement circuitry 150 of USB system 140) to measure repetitive carrier signal frequency using an internal reference clock (comparable to local reference clock 130 of FIG. 7). Each of the USB devices 170 measures carrier signal frequency with some finite error. As the error is essentially random, statistical analysis is used to analyse measurements from the USB devices 170 and thereby reduce the overall uncertainty in measurement of the carrier signal frequency. Thus, in this embodiment, the absolute frequency of the clock carrier signal frequency of USB Host Controller 164 is determined to a greater accuracy than would be achievable with a single USB device.

Figure 10:
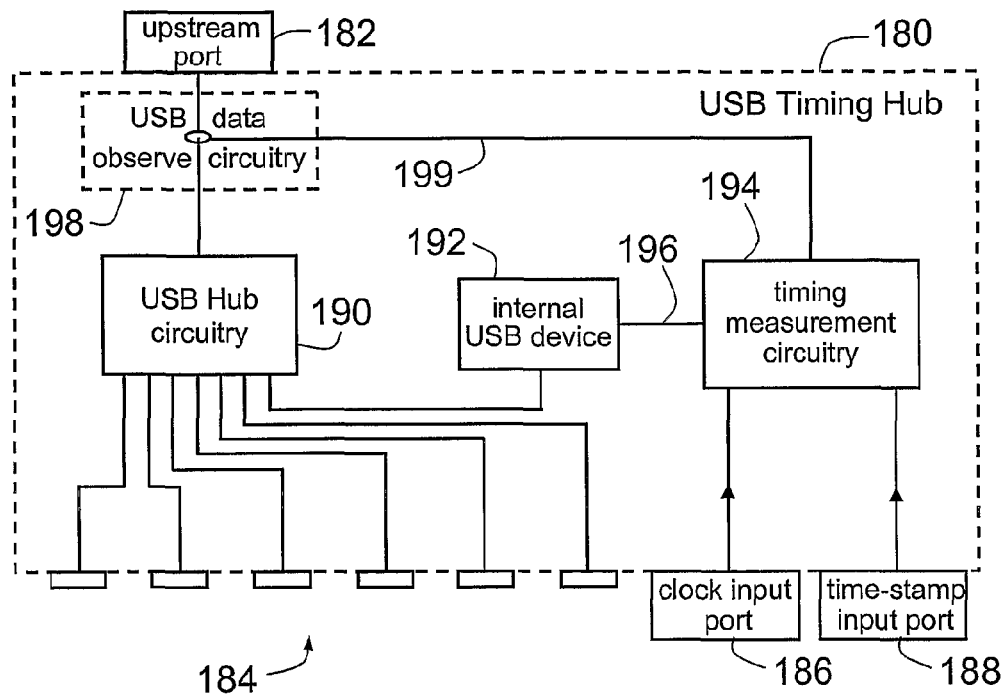
FIG. 10 is a schematic view of a USB Timing Hub according to a fifth embodiment of the present invention.

FIG. 10 is a schematic representation of a USB Timing Hub 180 according to a fifth embodiment of the present invention. The USB Timing Hub 180 has an upstream port 182 for connection to a Host Controller (or intermediate upstream device between USB Timing Hub 180 and a Host Controller), a plurality of downstream ports 184 (that provide USB expansion), an external reference clock input port 186, and an external reference time-stamp input port 188.

USB upstream port 182 is connected to USB Hub circuitry 190 that provides USB expansion to the plurality of downstream USB ports 184; one of the downstream USB ports 184 is directed to an internal USB device 192. Internal USB device 192 is connected to timing measurement circuitry 194 (comparable to timing measurement circuitry 112 of FIG. 6) via a communication bus 196. The timing measurement circuitry 194 contains an internal local reference clock (comparable to local reference clock 130 of FIG. 7) and also receives information from both external reference clock input port 186 and external time-stamp input port 188. The timing measurement circuitry 194 also observes USB data traffic on the upstream port 182 with USB monitoring circuitry 198 and uses this signal 199 to decode the USB Host Controller clock carrier signal for measurement of the carrier signal frequency.

Thus, USB Timing Hub 180 contains both circuitry 194 (of the type described by reference to FIG. 7) to determine the absolute clock rate of a USB Host Controller and normal USB Hub circuitry 190. Such a hybrid device provides both USB Host Controller clock carrier signal frequency information and expansion of the USB.

According to a sixth embodiment of the present invention, the synchronous channel count of a USB system can be extended beyond that allowed by the USB specification (which is currently 127 devices including hubs). This embodiment allows a plurality of discrete USBs to be synchronized by delivering a common external reference clock signal to each of the USBs. The common reference clock signal is then used to measure the USB Host Controller clock carrier signal of each of the USBs and subsequently to use that information to synthesise a known frequency on the local clocks on each USB device connected to any of the USBs to an essentially arbitrary degree.

Figure 11:
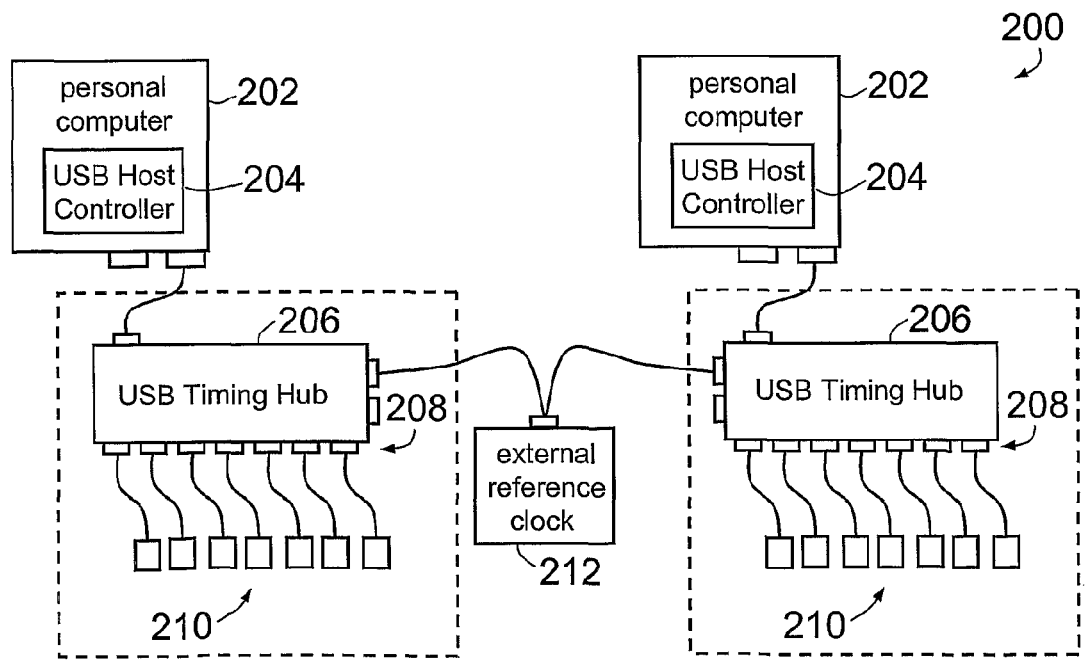
FIG. 11 is a schematic view of a system for increasing the synchronous channel count of a USB according to a sixth embodiment of the present invention.

Thus, FIG. 11 is a schematic view of a system 200 according to a sixth embodiment for increasing the synchronous channel count of a USB, in which a plurality of synchronized USBs are synchronized to an arbitrary degree. The system 200 includes a plurality of personal computers 202, each containing a USB Host Controller 204. Each personal computer 202 is connected to a hybrid USB Timing Hub 206 (of the type described and illustrated at 180 to FIG. 10); each USB Timing Hub 206 provides a plurality of synchronized USBs 208 to allow expansion to a plurality of USB devices 210. An external reference clock 212 provides a signal to the synchronized USBs 208 by means of the USB Timing Hubs 206. In an alternative arrangement, system 200 omits the USB Timing Hubs 206, and the USB devices are configured to receive the external reference clock signal directly. However the use of the USB Timing Hubs 206 are preferred.

According to a seventh embodiment of the present invention, a synchronized USB is provided with an external reference clock signal that is frequency accurate and time-stamp accurate to an arbitrary degree. These signals allow the USB to be synchronized to an arbitrary accuracy. This embodiment uses an external Global Positioning System (GPS) Time Server as the external synchronization reference. The GPS Time Server reference clock signal is delivered by means of satellite communication. Furthermore, the GPS Time Server can deliver absolute time-stamp information accurate to an arbitrary degree, regardless of position, essentially anywhere.

Figure 12:
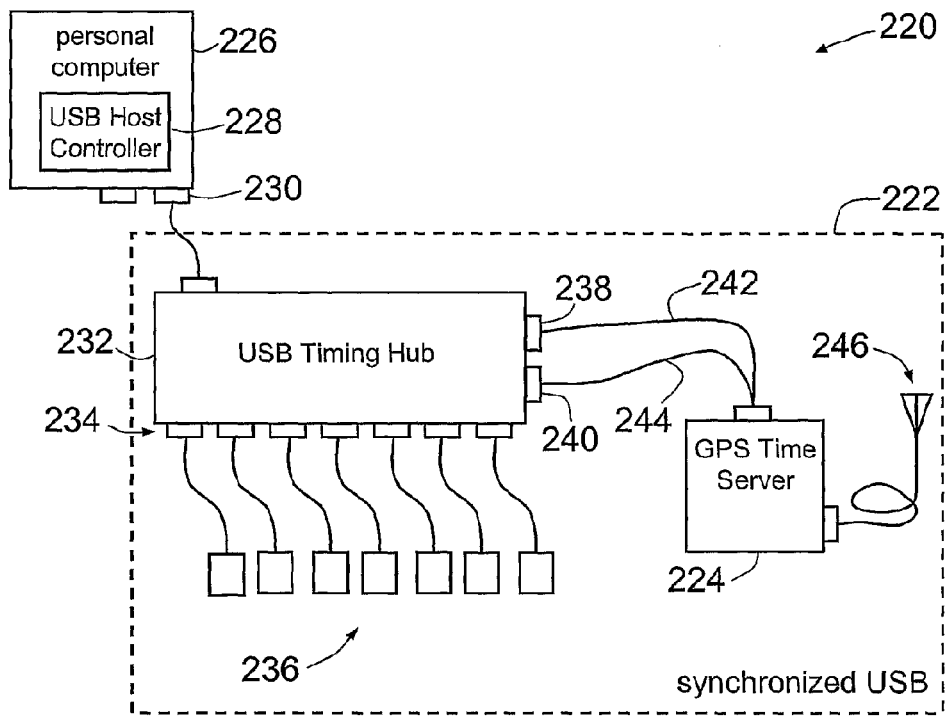
FIG. 12 is a schematic diagram of a synchronized USB according to a seventh embodiment of the present invention.

Thus, FIG. 12 is a schematic diagram of a system 220 in which a USB 222 is synchronized to a GPS Time Server 224. System 220 includes a personal computer 226 containing a USB Host Controller 228, connected to synchronous USB 222, where synchronous clock frequency is accurate to an arbitrary degree.

USB port 230 of personal computer 226 connects to USB Timing Hub 232, which provides downstream expansion ports 234 for the attachment of additional USB devices 236. USB Timing Hub 232 (of the type described and illustrated at 180 to FIG. 10) also has ports 238, 240 for receiving, respectively, a reference clock signal 242 and time-stamp information 244 from GPS Time Server 224. The GPS Timer Server 224 is connected to an antenna 246 for receiving GPS time and position information.

It will be appreciated that other means for providing a globally synchronized external reference clock and time signal may be employed in this embodiment, without departing from the scope of the invention.

Figure 13:
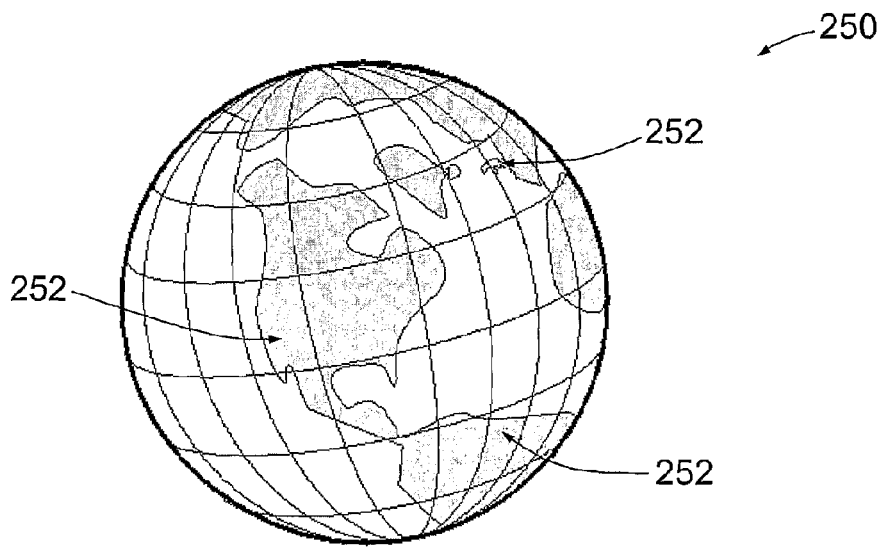
FIG. 13 is a schematic view of a globally synchronized USB according to the embodiment of FIG. 12.

FIG. 13 is accordingly a schematic representation of a USB 250 globally synchronized according to this embodiment. Globally synchronized USB 250 comprises a plurality of USBs located at different locations 252; each is of the type shown at 222 in FIG. 12, so each is synchronized by a separate GPS Time Server. The plurality of GPS Time Servers provide reference clock signals that are frequency locked to an essentially arbitrary degree by means of satellite communication. Furthermore, the plurality of GPS Time Servers each deliver absolute time-stamp information to their respective USB Timing Hub accurate to an arbitrary degree, regardless of position, anywhere on earth. Thus, a plurality of otherwise independent USBs are synchronized. Such a system is capable of accurate synchronization anywhere on earth for a widely distributed synchronous USB. This also has the capability of unlimited channel count by adding as many synchronized USBs (222 of FIG. 12) as desired.

According to a eighth embodiment of the present invention, a synchronized USB can be synchronized to a synchronized Ethernet (that is, a network that is in internal data communication according to the Ethernet protocol). In this embodiment, the synchronized USB is provided with an external signal from a synchronized Ethernet that contains timing information according to IEEE-1588 Precision Time Protocol. Said external signal contains both an Ethernet communication pathway and a Precision Time Protocol pathway. In this way, both data and timing information can be communicated between USB and Ethernet systems.

Figure 14:
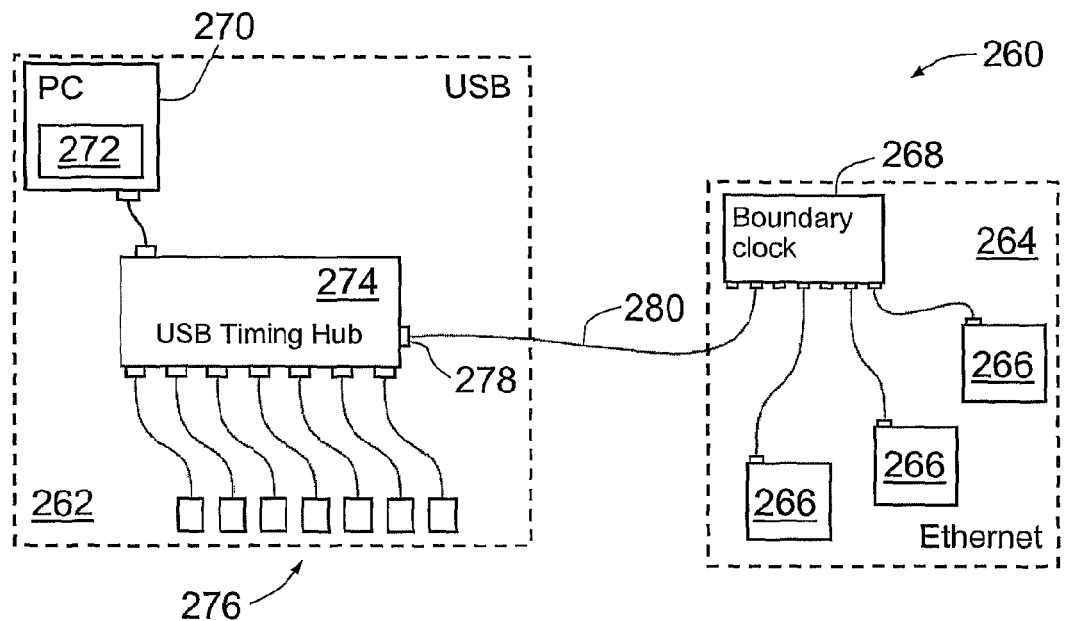
FIG. 14 is a schematic diagram of a USB synchronized to an Ethernet according to a eighth embodiment of the present invention.

Thus, FIG. 14 is a schematic diagram 260 of a USB 262 synchronized to Ethernet 264. The synchronized Ethernet 264 contains a plurality of devices 266 to be synchronized and an Ethernet Boundary Clock 268. The Boundary Clock 268 performs Ethernet connectivity between devices as well as compensating for latency and timing jitter present in traditional Ethernet switches and routers. The synchronized USB 262 includes a personal computer 270 with a USB Host Controller 272 and, connected to Host Controller 272, a hybrid USB Timing Hub 274. USB Timing Hub 274 provides connectivity expansion to a plurality of USB devices 276. USB Timing Hub 274 includes an IEEE-1588 compatible port 278 for communication of data and timing information 280 to synchronous Ethernet 264.

The IEEE-1588 Precision Time Protocol contains a protocol for determining which node of a network is the time-base master. It will be apparent to those skilled in the art that any node (viz. device 266) of the synchronous Ethernet 264 or the synchronous USB 262 can be the time-base master clock depending on the absolute accuracy of all device clocks.

Figure 15:
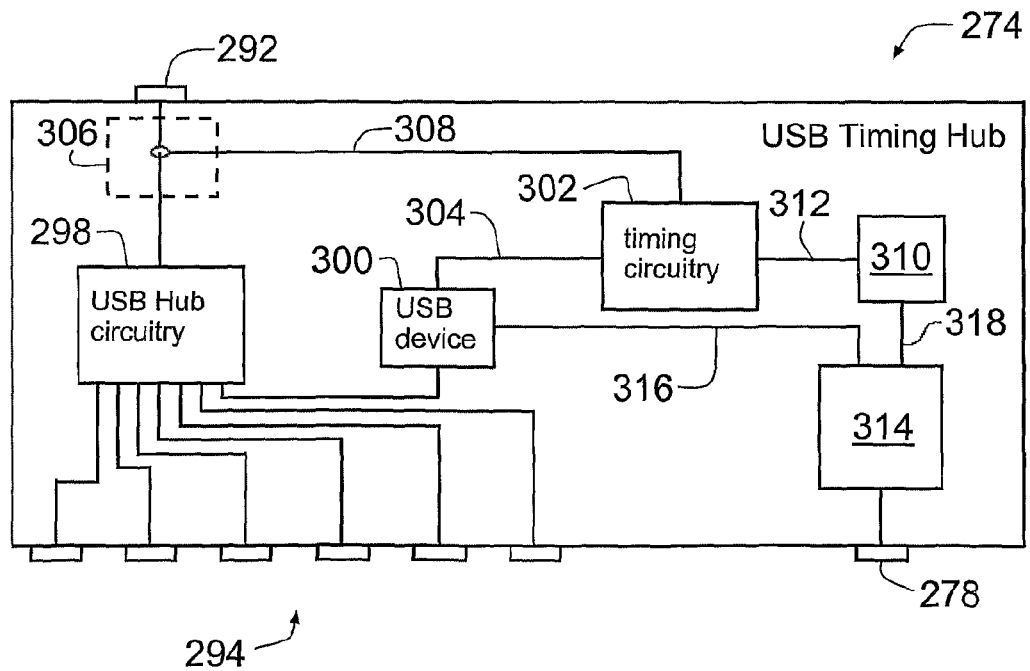
FIG. 15 is a schematic diagram of the USB-Ethernet synchronizing circuitry of the USB Timing Hub of the USB of FIG. 14.

FIG. 15 is a detailed schematic diagram of USB Timing Hub 274 of USB 262 of FIG. 14. The hybrid USB Timing Hub 274 has an upstream port 292 for connection to Host Controller 272 (or an intermediate upstream device between USB Timing Hub 274 and Host Controller 272), a plurality of downstream ports 294 (that provide USB expansion) and external port 278 for connectivity to the synchronous Ethernet.

USB Timing Hub 274 includes USB Hub circuitry 298, to which USB upstream port 292 is connected, that provides USB expansion to the plurality of downstream USB ports 294; one of the downstream USB ports 294 is directed to an internal USB device 300. Internal USB device 300 is connected to timing measurement circuitry 302 (comparable to timing measurement circuitry 112 of FIG. 6) via a communication bus 304.

Timing measurement circuitry 302 also observes USB data traffic on the upstream port 292 by means of USB monitoring circuitry 306, and uses the signal 308 therefrom to decode the USB Host Controller clock carrier signal for measurement of the carrier signal frequency. Timing measurement circuitry 302 contains an internal local reference clock (comparable to local reference clock 130 of FIG. 7) and also receives or transmits information to an additional local clock 310 through clock control channel 312. In this way, either the local clock 310 or a clock in the form of timing measurement circuitry 302 can be the local master clock for use determining the carrier signal frequency.

USB Timing Hub 274 includes a synchronous Ethernet controller 314 to which is connected external port 278 and which provides external Ethernet connectivity and supports IEEE-1588 Precision Time Protocol. Synchronous Ethernet controller 314 has a data channel 316 for communication of data between the external Ethernet (shown at 264 in FIG. 14) and internal USB device 300. In this way data is transferred from the external synchronous Ethernet 264 via synchronous Ethernet controller 314 and internal USB device 300 the personal computer (270 of FIG. 14).

Synchronous Ethernet controller 314 also contains a synchronization channel 318 through which local clock 310 can be synchronized to external Ethernet 264. In this way timing information is passed between synchronous Ethernet controller 314 and local clock 310, thereby effecting a hybrid synchronized USB/Ethernet system using the best of both interfaces: Ethernet provides wide ranging connectivity but limited synchronization capabilities, while USB provides a local precision synchronization network.

Figure 16:
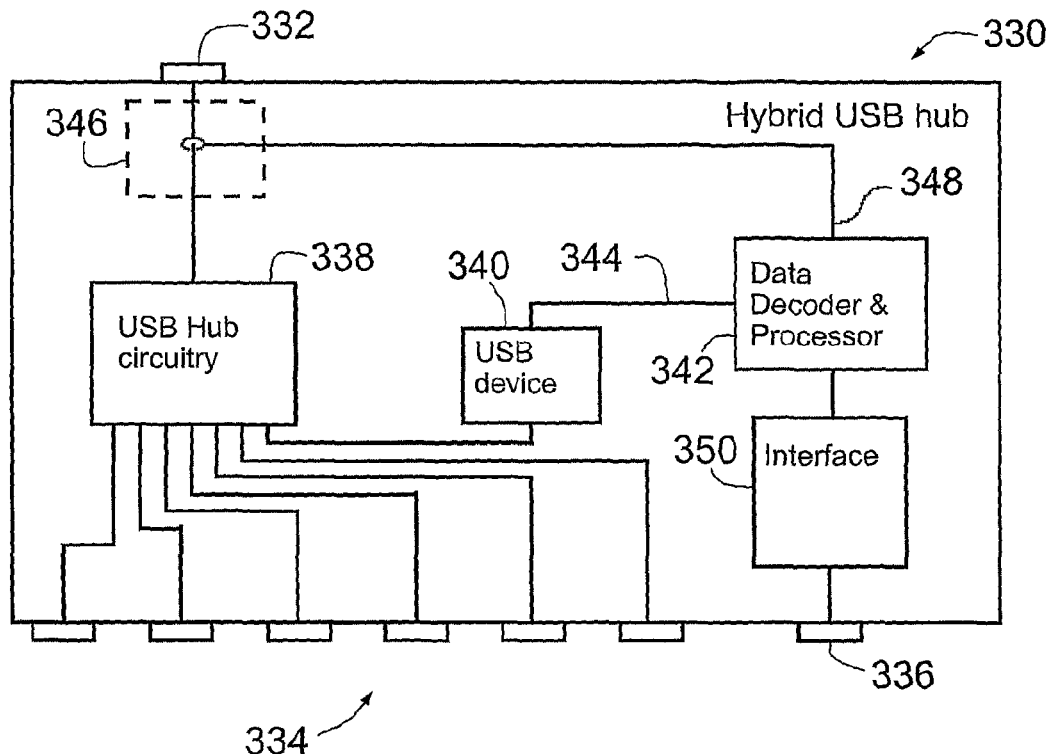
FIG. 16 is a schematic diagram of a hybrid USB hub according to a ninth embodiment of the present invention that provides a control path that is not subject to the normal USB latency delays.

According to a ninth embodiment of the present invention, a USB is provided that provides a control path that is not subject to the normal latency delays of USB (such as the 30 ms time frame implied by the typically 30 ms thread cycle time of the Windows (trade mark) operating system). Thus, FIG. 16 is a schematic diagram of a hybrid USB hub 330 according to this embodiment that provides an additional data pathway for reducing USB control loop latency. USB hub 330 has an upstream port 332 for connection to a Host Controller (or intermediate upstream device between Hybrid USB Hub 330 and a Host Controller), a plurality of downstream ports 334 (that provide USB expansion) and an external control port 336 for connectivity to external interfaces, equipment or transducers.

USB hub 330 also has USB Hub circuitry 338 (connected to Upstream port 332) that provides USB expansion to the plurality of downstream USB ports 334, and an internal USB device 340 to which is directed one of the downstream USB ports 334. USB hub 330 includes an internal USB device 340 and a Data Decoder and Processor 342, mutually connected by a communication bus 344.

Data Decoder and Processor 342 observes USB data traffic on the upstream port 302 with USB monitoring circuitry 346 and uses the resulting signal 348 to decode USB communications. Communication between Data Decoder and Processor 342 and external control port 336 is controlled by an Interface 350. Interface 350 can be an Ethernet interface, a serial communication interface (such as a SPI (Serial Peripheral Interface) bus, a CAN Controller Area Network, a Profi-Bus, a Process Field Bus or a USB (including USB-on-the-go), a parallel communication interface (such as a Centronics (trade mark) Parallel Port or an IDE (Integrated Drive Electronics) bus). Furthermore, external control port 336 can provide either single-ended or differential signalling, and can be adapted to any desired form of connectivity, whether copper cabling, fibre-optical cabling, wireless communication channels or otherwise.

In this way, data that is being transmitted between a Host Controller and any USB device attached to downstream ports 334 can be intercepted and interpreted in USB hub 330 and used to immediately control an external device through the external control port 336. This circumvents the normal communication and control loop latency of USB.

It will be apparent to those skilled in the art that, although various embodiments of the present invention described herein include a hybrid USB Hub, these techniques need not be employed in a USB hub, but may in fact be used in any device that is at least attached to a USB for the purpose of detecting USB data flows and acting on the information contained therein.

Figure 17:
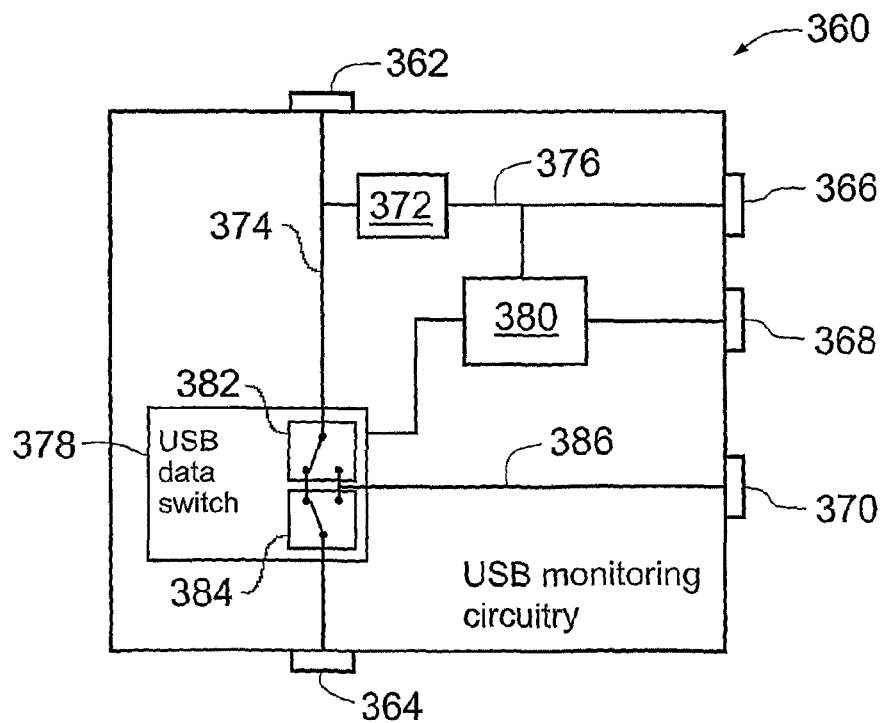
FIG. 17 is a schematic diagram of the USB monitoring circuitry of the Hybrid USB Hub of the synchronized USB of FIG. 16.

Thus according to a variation of the ninth embodiment of the present invention, there is provided a system with a hybrid USB hub (comparable to USB hub 330 of FIG. 16) with an additional data pathway that allows control loop responses to be reduced to an arbitrarily short time. FIG. 17 is a schematic diagram of USB monitoring circuitry 360 (comparable to USB monitoring circuitry 346 of USB hub 330 FIG. 16); USB monitoring circuitry 360 has an upstream port 362 for connection to the Host Controller side of the bus, a downstream port 364 for connection to the device side of the bus, a USB data monitoring port 366 for transmission of a replica of the USB data stream present at the USB upstream port 362, a data switch control port 368 for controlling internal data pathways inside the circuit, a bidirectional data port 370 and buffering circuitry 372. Buffering circuitry 372 observes USB data signal 374 (which comprises bidirectional communications between the Host Controller and attached devices) and provides a buffered replica signal 376 thereof. Replica signal 376 is an exact copy of the bidirectional communication present on the USB, is transmitted on the USB data monitoring port 366 and is typically comparable to signal 308 of FIG. 15.

Thus, USB monitoring circuitry 360 is able to monitor all USB data packets and provide a buffered replica signal 376 of USB data signal 374 for use by external circuitry. Buffered replica signal 376 can be used by external circuitry for decoding periodic signal structures from the Host Controller within USB data to identify carrier signals which contain information about the clock rate of the USB Host Controller. Buffered replica signal 376 can also be used to decode information from all downstream USB devices as it passes upstream toward the Host Controller. In this way, direct action can be taken on the information from downstream devices without first requiring the Host Controller and associated operating system to process and act on the data.

USB monitoring circuitry 360 also includes additional circuitry for advanced data management, switching and reducing USB control loop latency, including a USB data switch 378 (shown as a pair of simple single pole switches in figure 17 for simplicity, though in reality USB data signals are differential) and data controller circuitry 380 for controlling USB data switch 378. USB data switch 378 contains an upstream switch 382 and a downstream switch 384, and is configured to synchronously direct USB data signal 374 from upstream port 362 either directly to the downstream port 364 (the configuration shown in FIG. 17) or utilising a bidirectional data stream 386 from external circuitry via bidirectional data port 370. USB data switch 378 has access to buffered replica signal 376, and data controller circuitry 380 is configured by data switch control port 368. In this way, USB data switch 378 can be switched synchronously with the USB data signal as monitored at 374.

USB monitoring circuitry 360 is also able to dynamically configure itself to insert data within a USB data stream. A message from the Host Controller to a device may be intercepted and altered by USB monitoring circuitry. In this way, software can be configured to provide regular polling of a particular USB device with a known data packet size. USB monitoring circuitry, having access to the size of a specified regularly polled packet, can insert data within the payload of a transaction by synchronously bypassing the direct connection (viz. the configuration of USB data switch 378 shown in FIG. 17) and inserting data into the payload field of the transaction.

FIG. 18A depicts the configuration of USB data switch 378 of FIG. 17 for downstream insertion of payload data 388 at 378'; FIG. 18B depicts the configuration of USB data switch 378 of FIG. 17 for upstream insertion of payload data 390 at 378". During downstream insertion of data the switch must initially be configured as shown at 378 in FIG. 17 while the host transmits the transaction packet header information, but switch to configuration 378' of FIG. 18A for insertion of the payload and CRC data 388. For upstream insertion of data, the device waits until it detects the polling request from the Host Controller before switching to configuration 378" of FIG. 18B for transmission of the entire upstream transaction (including header). It should be noted that the device may alternatively wait for the upstream transaction packet header pass upstream before switching to configuration 378" of FIG. 18B and inserting the payload data 390.

FIG. 18C is a schematic timing diagram for downstream data insertion (upper portion of the figure) and the upstream data insertion (lower portion of the figure), indicating the configuration of the USB data switch.

According to a tenth embodiment of the present invention, there is provided a Hybrid USB Host Controller that is synchronized to a synchronized Ethernet, to ensure that the attached synchronized USB is also synchronized to the synchronized Ethernet. The Hybrid USB Host Controller is provided with an external signal from a synchronized Ethernet that contains timing information according to IEEE-1588 Precision Time Protocol. The external signal contains both an Ethernet communication pathway and a Precision Time Protocol pathway. In this way, both data and timing information can be communicated between Hybrid USB Host Controller and Ethernet systems.

In this embodiment, the Hybrid USB Host Controller contains an embedded microcontroller so that it is a stand-alone device that is not dependent on a host personal computer. The Hybrid USB Host Controller may contain a standard USB Host controller, a USB-on-the-go Host Controller, a wireless USB Host Controller or any other form of USB Host Controller.

FIG. 19 is a schematic diagram of a system 400 according to this embodiment, comprising stand-alone USB 402 (that is, one containing an embedded controller that does not require attachment to a personal computer) and an Ethernet 404, synchronized to each other. The Ethernet 404 typically contains an Ethernet Boundary Clock 406 and a plurality of devices to be synchronized 408. Boundary Clock 406 performs Ethernet connectivity between devices as well as compensating for latency and timing jitter present in traditional Ethernet switches and routers. USB 402 consists of a Hybrid USB Host Controller 410 and a plurality of USB devices (or USB Hubs for further expansion) 412.

In this embodiment, Hybrid USB Controller 410 contains an embedded USB Hub functionality providing a plurality of downstream expansion ports. Hybrid USB Controller 410 also includes an IEEE-1588 compatible port 414 for communication of data and timing information 416 to Ethernet 404.

Figure 20:
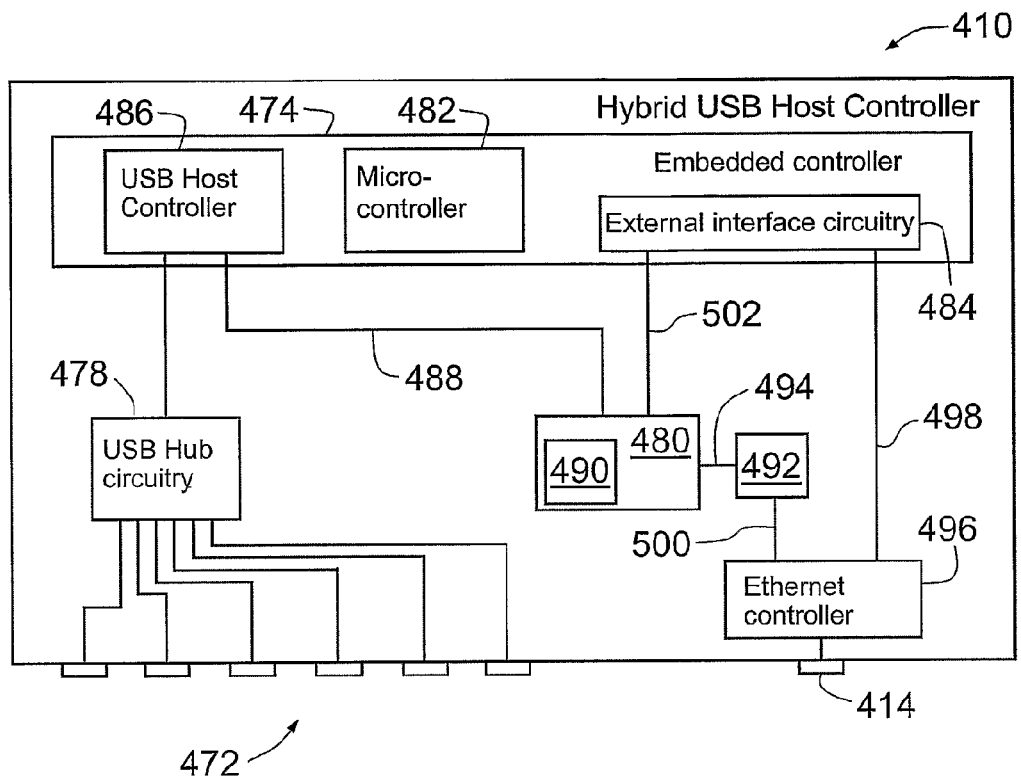
FIG. 20 is a schematic diagram of the Hybrid USB Host Controller of the USB of the embodiment of FIG. 19.

FIG. 20 is a more detailed schematic diagram of Hybrid USB Host Controller 410 of FIG. 19. Hybrid USB Host Controller 470 has a plurality of downstream ports 472 (that provide USB expansion), an embedded controller 474, USB Hub circuitry 478 and USB master clock circuitry 480. Controller 474 has an embedded microcontroller 482, external interface circuitry 484 and a USB Host Controller 486. USB Host Controller 486 is connected to USB Hub circuitry 478 that provides USB expansion to the plurality of downstream USB ports 472 and USB master clock circuitry 480 through a clock bus 488.

USB master clock circuitry 480 contains an internal local reference clock 490 and also receives or transmits information to an additional local clock 492 (also a part of Hybrid USB Host Controller 410, and in the form of a synchronous Ethernet IEEE-1588 clock) through a clock control channel 494. Hybrid USB Host Controller 410 further includes a synchronous Ethernet controller 496, to which external port 414 is connected and which provides external Ethernet connectivity and supports IEEE-1588 Precision Time Protocol. Synchronous Ethernet controller 496 has a data channel 498 for communication of data between the external Ethernet and external interface circuitry 484 of embedded controller 474. A bidirectional data link is therefore provided between the external synchronous Ethernet and the synchronized USB through synchronous Ethernet controller 496 and the embedded controller 474.

Synchronous Ethernet controller 496 also has a clock control channel 500 for communicating with synchronous Ethernet clock 492. IEEE-1588 clock 492 may be either the bus master if it is more accurate than the clocks of other attached IEEE-1588 clocks or a slave clock that is slaved to a more accurate attached IEEE-1588 clock. Hybrid USB Host Controller 410 includes a control channel 502 between external interface circuitry 484 of embedded controller 474 and USB master clock circuitry 480 enabling the embedded controller 474 to control clock signals. In a similar way either the local reference clock 490 or the IEEE-1588 clock 492 acts as the system master clock, according to which is the more accurate.

USB Host Controller 486 uses the clock signal from clock bus 488 as its master timing reference. This clock signal can be precisely tuned in USB master clock circuitry 480 to provide a frequency accurate time reference to arbitrary precision for synchronous USB control. Accordingly, the frequency of a periodic signal structure (such as a Start of Frame token) in the USB data stream can be accurately controlled, resulting in a synchronized USB with precisely controlled timing. In this way a hybrid synchronized USB/Ethernet system is achieved without requiring a personal computer. It will be apparent, in addition, that latency can be improved in this arrangement according to the approach described in the context of the embodiments of FIGS. 16 and 17.

Figure 21:
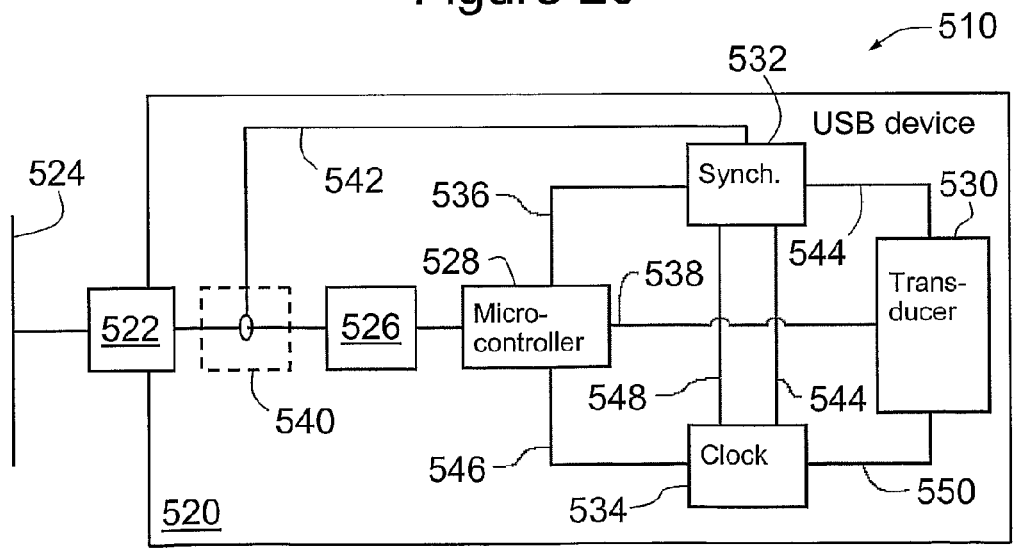
FIG. 21 is a schematic diagram of a USB device with a notion of real time according to an eleventh embodiment of the present invention.

A USB device according to an eleventh embodiment of the present invention is shown schematically with a USB at 510 in FIG. 21. In this embodiment, the synchronized USB device might be said to have some notion of (or data indicative of) real time. This notion or data of time is derived from USB bus transactions, the USB data stream and information received from the host system. Such a notion of real time is shared by all devices attached to the same USB.

Referring to FIG. 21, therefore, USB device 520 includes a bus connector 522 for connecting to USB 524, digital I/O bus interface circuitry 526, a microcontroller 528, a digitally controlled transducer 530, synchronization circuitry in the form of synchronizer 532 (comparable to synchronizer circuitry 62 of FIG. 5) and real time clock 534. The digital I/O bus interface circuitry 526 acts as a transceiver for USB data detected at bus connector 524, and passes the USB data to microcontroller 528. The microcontroller 528 is provided with an information channel 536 to synchronizer 532 and a direct control channel 538 to digitally controlled transducer 530.

USB device 520 has circuitry 540 at USB connector 522 that detects USB data traffic on USB 524, and generates and passes a replica 542 of the USB data traffic to synchronizer 532. Synchronizer 532 (which is comparable to synchronizer 46 of FIG. 4) generates a local clock signal 544 that is frequency and phase controlled to an arbitrary precision, and will be synchronous with those of any similar USB devices attached to the same USB 524. Local clock signal 544 is passed to both the digitally controlled transducer 530 to control its operation and to real time clock 534.

Real time clock 534 can be synchronized to an absolute time and then clocked by local clock signal 544. In this way, a plurality of USB devices can operate sharing a common notion of real time each being clocked by a synchronous local clock. Synchronization of the real time clock 534 is initiated by a command from the host personal computer; this command is interpreted by microcontroller 528 and transferred to both synchronizer 532 (via information channel 536) and real time clock 534 through another information channel 546. Synchronizer 532 then acts to synchronize real time clock 534 through a real time synchronizing channel 548. In this way, the real time clock can be synchronized to a known time. Real time clock 534 can then deliver real time trigger signals 550 (which may also include a time stamp from the real time clock) to control the operation of digitally controlled transducer 530 such that it performs actions at specified time.

Figure 22:
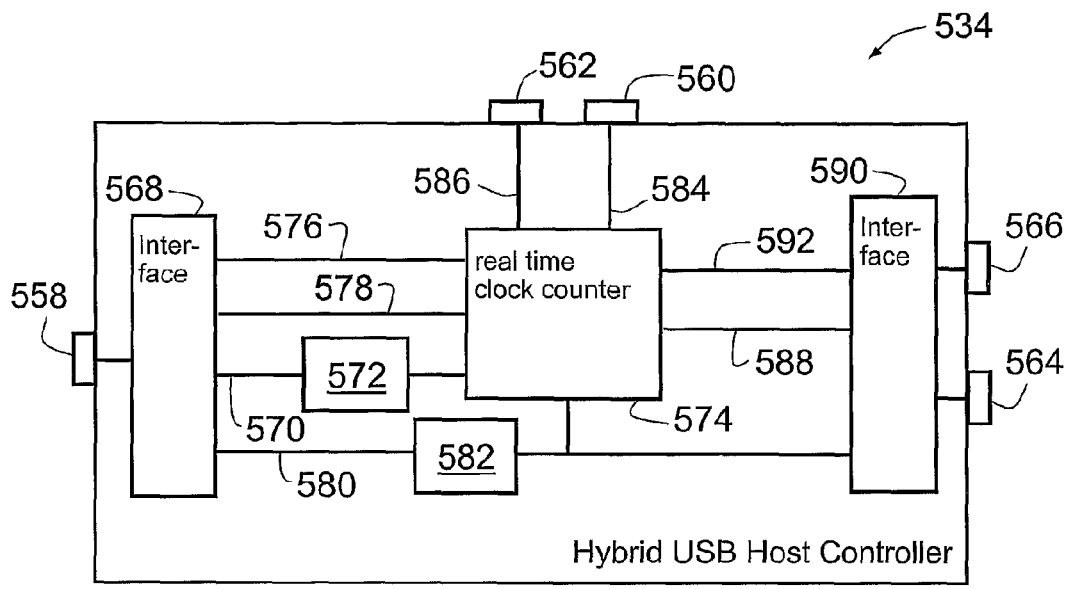
FIG. 22 is a schematic diagram of the real time clock circuitry of the USB device of FIG. 21.

FIG. 22 is a detailed schematic diagram of the real time clock 534 of USB device 520 of this embodiment. Real time clock 534 has a control port 558 for communication with microcontroller 528 (see FIG. 21), a synchronous clock input port 560 for receiving synchronous clock signals 544 from synchronizer 532 (see FIG. 21), a synchronizing port 562 for receiving synchronizing signals on synchronizing channel 546 (see FIG. 21), an output port 564 and an input event/timestamp port 566.

Control port 558 receives information signals which are decoded by interface 568 to provide a data signal 570 that contains the absolute time value, which is loaded into a temporary register 572 (for subsequent synchronous latching into real time clock counter 574), a data latch signal 576 for latching data signal 570 into the real time clock counter 574, a counter enable signal 578 for enabling the real time clock counter 574, and another data signal 580 to be loaded into a counter comparator 582.

Real time clock counter 574 also receives a synchronous clock signal 584 from synchronous clock input port 560, which is used to increment the real time clock counter 574, and a resynchronize signal 586 from synchronizing port 562, which can be used to synchronously clear the real time clock counter 574. The resynchronize signal 586 is generated from synchronizer 532 such that it occurs synchronously with a start of frame (SOF) token in the USB (or more precisely, synchronously with a synthetic SOF). This synchronizing synthetic SOF token frame number is known to the host controller (which keeps track of rollover of this number since the host began) and can therefore synchronize the device (or a plurality of similar devices) at the same point in time. Furthermore, the host maintains knowledge of the rollover of this synthetic SOF token number and of the absolute timestamp of the real time clock counter 574, so USB devices need not be synchronized at the same point in time. Once a single USB device has been synchronized to real time according to this technique, the host can calculate the real time at any future synthetic SOF frame token. This allows any number of devices to be synchronized in a sequential manner.

In this way, real time clock counter 574 can either be synchronously loaded with a known 'real time' by microcontroller 528 (see FIG. 21) and time counting initiated by resynchronizing signal 586, or synchronously cleared by resynchronizing signal 586 with the counter incremented in both cases by synchronous clock signal 584. The system controller (such as a personal computer) then determines how the notion of time is represented by the real time clock counter 574.

The real time value 588 (a data signal) is clocked out of real time counter 574 on each cycle of synchronous clock signal 584 to interface 590 which provides signals for external circuitry through output port 564. Furthermore, real time clock 534 can be configured to provide a trigger signal 592 by comparing the instantaneous real time value 588 with a data signal that has previously been latched into counter comparator 582. Trigger signal 592 is then passed to output interface 590 for transmission to external circuitry.

Interface 590 also receives external signals from an event with associated timestamp data from external event/timestamp port 566. This data 592 is passed to real time clock counter circuitry 574 for calibration and setting of real time of the local clock contained therein.

It should be noted that this notion of real time can be shared by a plurality of synchronized USBs, such as according to the approach employed in system 220 of FIG. 12 or those embodiments described above that conform to IEEE-1588.

Furthermore, synchronous clock signal 584 and resynchronizing signal 586 are synchronous with carrier signals (as described above in the context of USB device 50 of FIG. 4). Thus, it is possible to determine the real time of the reception of these carrier signals and hence set the real time of real time clock counter 574 of FIG. 22.

Figure 23:
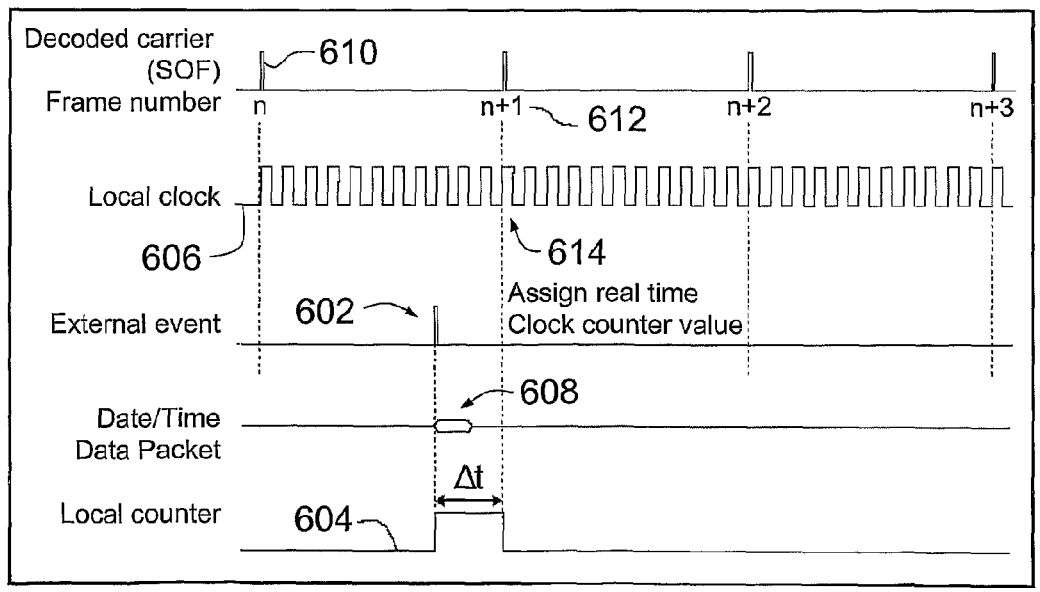
FIG. 23 is a timing diagram of the USB device of FIG. 21.

FIG. 23 is a timing diagram 600 of the USB device 520 of FIG. 21. External event 602 of known real time can be used to start a local counter 604, which is clocked from the synchronous clock signal 606 (derived from synchronizer circuitry 62 of FIG. 4), and the real time 608 of external event 602 is latched into the device. Reception of the next decoded carrier signal 610 (synthetic start of frame) token stops local counter 604 and latches the number 612 of the frame token. The host controller can then determine the real time of latched frame token number 612 using the time elapsed of local counter 604 (time Δt between the event and the start of frame token).

In this way, an external event of known real time at event/timestamp port 566 can be used to determine the real time of the arrival of local carrier signal and hence set (or calibrate) the real time of a USB device 520. Real time determined by this method is latched into real time clock counter (574 of FIG. 22) at 614. Such an externally derived real time event and time stamp may be generated by a known frequency and time reference, such as a precision Caesium clock, a GPS time server that is locked to a global positioning satellite system or an IEEE-1588 precision time protocol device.

In the absence of an external precision time stamped reference event 602, the host personal computer can assign its own notion of time (from its internal, inaccurate real time clock) to the synchronous USB. This method merely assigns the personal computer's notion of time to a given carrier frame number as the reference time for use by the real time clock counter. From that time forward, the synchronous USB has highly precise relative accuracy (as defined by its real time clock counter circuitry) but with an offset from absolute time determined by the initial error of the host personal computer's real time clock.

By extension, using multiple external events of known time, the carrier signal frequency can be determined to an arbitrary degree, using the approach employed in device 100 of FIG. 6. This is a method of generating a time stamp of an external event, relative to a known carrier signal number.

It should be noted that this approach can be implemented in a hub or a USB device, or in a device attached to the USB. It can also be implemented once or in multiple devices to improve accuracy by statistical means.

Figure 24:
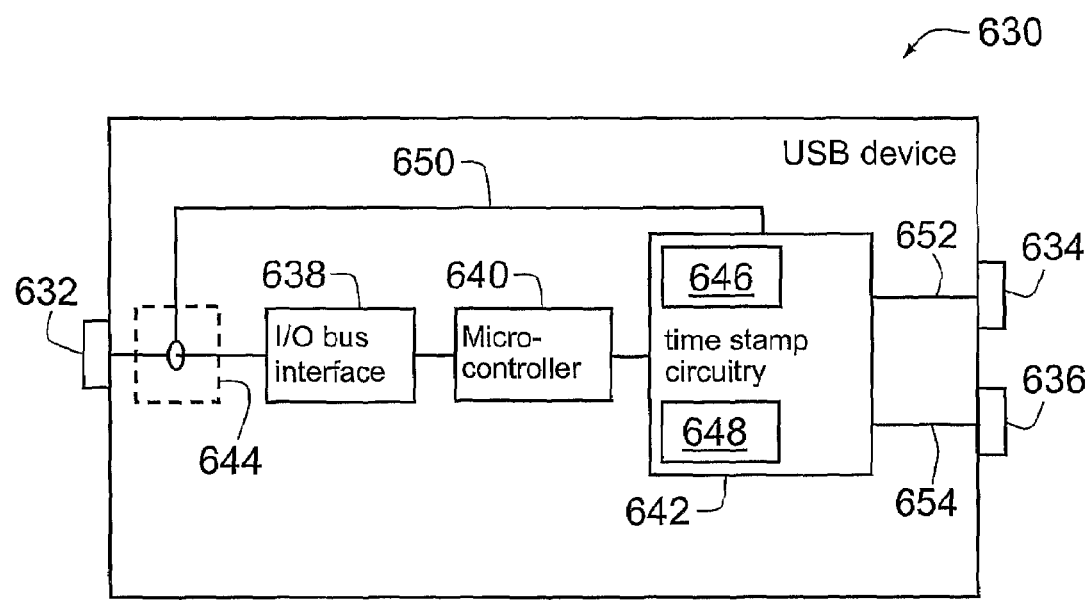
FIG. 24 is a schematic diagram of a USB device according to a twelfth embodiment of the present invention that can accurately time stamp external events.

A USB device according to a twelfth embodiment of the present invention is shown schematically at 630 in FIG. 24. In this embodiment, the synchronized USB device 630 can time stamp external events according to its own notion of time, which has either been calibrated by its own real time clock or by an externally provided real time clock and time stamp.

The USB device 630 has an upstream port 632 for connection to a Host Controller (or intermediate upstream device between USB device 630 and such a host controller), an external trigger port 634 and a data port 636 for communication of time stamp information. USB device 630 also includes digital I/O bus interface circuitry 638, microcontroller 640 and synchronizing time stamp circuitry 642. Time stamp circuitry 642 includes synchronizing circuitry 646 (comparable to timing measurement circuitry 302 of FIG. 15) that observes USB data traffic on the upstream port 632 by means of USB monitoring circuitry 644 to synchronize a local clock using the carrier signal contained in decoded USB data stream signal 650 and real time clock circuitry 648 (comparable to real time clock 534 of FIG. 22).

External event signals (otherwise known as external triggers) connected to external trigger port 634 and time stamp information present on data port 636 are passed to time stamp circuitry 642 for processing. In this way, external events (triggers) and associated time stamps can be passed to the device and correlated with a synchronized local clock contained in synchronizing circuitry 646.

Hence, once real time clock circuitry has been calibrated (such as by latching real time into real time clock counter 574 of FIG. 22), all external events can be time stamped according to real time clock counter 574.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention, except where the context requires otherwise owing to express language or necessary implication, the words "Host Controller" may be used to specify a standard USB Host controller, a USB-on-the-go Host Controller, a wireless USB Host Controller or any other form of USB Host Controller.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge.

The invention claimed is:

1. An apparatus for generating a local clock signal, comprising:
   a USB adapted to receive a USB data stream;
   a reference signal source for providing a reference signal;
   timing circuitry for determining a frequency of a periodic data structure decoded from the USB data stream by comparing the periodic data structure with said reference signal; and
   circuitry for generating a local clock signal having a desired local clock frequency, configured to receive an information signal having data indicative of said desired local clock frequency and to generate said local clock signal by:
   (i) generating a clock synchronization signal comprising clock and trigger signals by combining the periodic data structure with a scaling factor;
   (ii) generating a divided signal by dividing the reference signal;
   (iii) manipulating the clock synchronization signal and the divided signal according to the desired local clock frequency;
   (iv) generating a phase comparison signal by phase comparing the manipulated clock synchronization signal and divided signal; and
   (v) generating the local clock signal with a controlled oscillator clock generator of the circuitry by using the phase comparison signal to control the controlled oscillator clock generator.

2. An apparatus as claimed in claim 1, further comprising a USB bus connector for connection to said USB and for transmitting said USB data stream to said USB.

3. An apparatus as claimed in claim 1, wherein said apparatus is a USB device.

4. An apparatus as claimed in claim 1, wherein said apparatus is adapted to determine said frequency of said periodic data structure in only one of a plurality of devices and to transmit a signal to other devices to control local clocks of said other devices accordingly.

5. An apparatus as claimed in claim 1, wherein said reference signal source is adapted to receive said reference signal from an external reference signal source.

6. An apparatus as claimed in claim 5, wherein the external reference signal source comprises an external reference clock, wherein said external reference clock comprises a precision frequency reference, a Global Positioning System (GPS) time server or an IEEE-1588 time server.

7. An apparatus as claimed in claim 1, further including a time-stamp latch and a reference time-stamp signal source, wherein said time-stamp latch is adapted to time stamp a data signal from said reference time-stamp signal source, whereby said time-stamp information can be synchronized to reception of a carrier signal.

8. An apparatus as claimed in claim 7, wherein said reference time-stamp signal source comprises a connector for connection to an external reference time-stamp signal source.

9. A method for generating a local clock signal, comprising:
receiving a USB data stream at a USB;
receiving a reference signal;
decoding a periodic data structure from said USB data stream;
determining a frequency of said periodic data structure by comparing the periodic data structure with the reference signal;
receiving an information signal having data indicative of a desired local clock frequency; and
generating a local clock signal having said desired local clock frequency by:
  (i) generating a clock synchronization signal comprising clock and trigger signals by combining the periodic data structure with a scaling factor;
  (ii) generating a divided signal by dividing the reference signal;
  (iii) manipulating the clock synchronization signal and the divided signal according to the desired local clock frequency;
  (iv) generating a phase comparison signal by phase comparing the manipulated clock synchronization signal and divided signal; and
  (v) generating the local clock signal with a controlled oscillator clock generator by controlling the controlled oscillator clock generator with the phase comparison signal.

10. A method as claimed in claim 9, including determining said frequency of said periodic data structure in only one of a plurality of devices and transmitting a signal to other devices to control local clocks of said other devices accordingly.

11. An apparatus as claimed in claim 1, further comprising:
a USB hub attachable to a USB host controller; and
a USB device attached to said USB hub, the USB device containing the timing circuitry;
wherein the timing circuitry is further adapted to make an estimate of a clock rate of the USB host controller.

12. An apparatus as claimed in claim 11, comprising a plurality of USB devices attached to said USB hub, each having timing circuitry for comparing a periodic data structure in said USB data stream with said reference signal and determining said frequency of said periodic data structure, wherein said apparatus is operable to make respective estimates of said clock rate and further comprises a data processor for receiving said estimates of said clock rate and for determining said clock rate of said USB host controller from said estimates.

13. An apparatus as claimed in claim 1, wherein said circuitry for generating said local clock signal can generate said local clock signal with a frequency that is a non-integral multiple of the frequency of said periodic data structure.

14. An apparatus as claimed in claim 1, wherein said circuitry for generating said local clock signal includes a phase comparator and frequency synthesis circuitry, and is adapted for generating a clock signal of arbitrary frequency.

15. An apparatus as claimed in claim 1, wherein said periodic data structure comprises a USB Start of Frame (SOF) packet token.

16. A method as claimed in claim 9, including generating said local clock signal with a frequency that is a non-integral multiple of the frequency of said periodic data structure.

17. A method as claimed in claim 9, further comprising determining a clock rate of a USB host controller from said frequency of said periodic data structure.

18. A method as claimed in claim 9, including generating said local clock signal with a frequency that is different from said frequency of said periodic data structure.

* * * * *